(12) United States Patent
Tomioka

(10) Patent No.: US 9,638,582 B2
(45) Date of Patent: May 2, 2017

(54) TERAHERTZ WAVE DETECTION DEVICE, CAMERA, IMAGING DEVICE, AND MEASURING DEVICE

(71) Applicant: SEIKO EPSON CORPORATION, Tokyo (JP)

(72) Inventor: Hiroto Tomioka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 271 days.

(21) Appl. No.: 14/184,578

(22) Filed: Feb. 19, 2014

(65) Prior Publication Data

US 2014/0264029 A1    Sep. 18, 2014

(30) Foreign Application Priority Data

Feb. 21, 2013    (JP) .................................. 2013-031789

(51) Int. Cl.
| | |
|---|---|
| *G01J 5/00* | (2006.01) |
| *G01J 5/10* | (2006.01) |
| *G01J 3/42* | (2006.01) |
| *G01J 5/34* | (2006.01) |
| *G01J 5/08* | (2006.01) |

(52) U.S. Cl.
CPC . *G01J 5/10* (2013.01); *G01J 3/42* (2013.01); *G01J 5/0853* (2013.01); *G01J 5/34* (2013.01); *G01J 2005/0077* (2013.01)

(58) Field of Classification Search
CPC ........................................................ G01J 5/10
USPC ...................................................... 250/338.3
See application file for complete search history.

(56) References Cited

U.S. PATENT DOCUMENTS

| | | | | |
|---|---|---|---|---|
| 2004/0065831 | A1* | 4/2004 | Federici | G01N 21/3581 250/341.1 |
| 2012/0018635 | A1* | 1/2012 | Takizawa | G01J 5/08 250/338.3 |
| 2012/0138799 | A1* | 6/2012 | Wakabayashi | G01J 5/024 250/338.3 |

FOREIGN PATENT DOCUMENTS

JP    2009-141661 A    6/2009

OTHER PUBLICATIONS

Tao et al., "Highly flexible wide angle of incidence terahertz metamaterial absorber: Design, fabrication, and characterization", Physical Review, vol. B 78, Dec. 19, 2008, pp. 241103-1-241103-4.

(Continued)

*Primary Examiner* — David Porta
*Assistant Examiner* — Carolyn Igyarto
(74) *Attorney, Agent, or Firm* — Maschoff Brennan

(57) ABSTRACT

A terahertz wave detection device which includes an absorption portion which absorbs a terahertz wave and generates heat and a conversion portion which converts the heat generated by the absorption portion into an electric signal, wherein the absorption portion includes a dielectric layer, a plurality of metal structures which are provided on one surface of the dielectric layer and are arranged to be separated from one another by an interval having a predetermined length; and a metal layer which is provided on the other surface of the dielectric layer, and wherein the interval is shorter than a wavelength of the terahertz wave which is absorbed by the absorption portion.

12 Claims, 17 Drawing Sheets

(56) References Cited

OTHER PUBLICATIONS

Alves, F., et al., "Strong terahertz absorption using SiO2/Al based metamaterial structures", Applied Physics Letters, vol. 100, Issue 11, Mar. 2012, pp. 1-4.

* cited by examiner

TERAHERTZ WAVE DETECTION DEVICE, CAMERA, IMAGING DEVICE, AND MEASURING DEVICE

RELATED APPLICATIONS

The present invention claims priority to Japanese Patent Application No. 2013-031789, filed Feb. 21, 2013, entitled "TERAHERTZ WAVE DETECTION DEVICE, CAMERA, IMAGING DEVICE, AND MEASURING DEVICE," which is incorporated herein by reference in its entirety.

BACKGROUND

1. Technical Field

The present invention relates to a terahertz wave detection device, camera, imaging device, and measuring device.

2. Related Art

In recent years, a terahertz wave, which is an electromagnetic wave having a frequency of 100 GHz or higher and 30 THz or lower, has attracted attention. Examples of applications where the terahertz wave can be used include imaging, various measurements such as a spectroscopic measurement, nondestructive inspection, and the like.

Japanese Patent Application No. JP-A-2009-141661 describes a detection device which detects a terahertz wave, the detection device including a bolometer, in which a resistance value of a resistor is changed according to temperature. Specifically, JP-A-2009-141661 describes a configuration where if terahertz waves are radiated to an antenna element, a power received by the antenna element is supplied to the bolometer, which acts as a detection element. More specifically, the resistance value of the bolometer is changed, voltages of both ends of the bolometer are changed by applied current, and thus, the received power of the terahertz waves can be output as detected voltages of the bolometer.

However, in the terahertz wave detection device described in JP-A-2009-141661, a current is applied to the bolometer to detect the terahertz waves, and accordingly, noise occurs, and detection sensitivity with respect to the terahertz waves may be decreased.

SUMMARY

An advantage of some aspects of the invention is to provide a terahertz wave detection device which suppresses a decrease of detection sensitivity due to electric noise. Another advantage of some aspects of the invention is to provide a camera, an imaging device, and a measuring device which include the above-described terahertz wave detection device.

An aspect of the invention is directed to a terahertz wave detection device including an absorption portion which absorbs a terahertz wave and generates heat, and a conversion portion which converts the heat generated in the absorption portion into an electric signal. Moreover, the absorption portion includes a dielectric layer, a plurality of metal structures which are provided on one surface of the dielectric layer and are arranged to be separated from one another by an interval having a predetermined length, and a metal layer which is provided on the other surface of the dielectric layer. In addition, the predetermined length of the interval is shorter than a wavelength of the terahertz wave which is absorbed by the absorption portion.

According to the terahertz wave detection device, a decrease of detection sensitivity due to electric noise can be suppressed.

According to the terahertz wave detection device with this configuration, reflectance of the terahertz wave on a contact surface of the metal structure with the dielectric layer and a contact surface of the metal layer with the dielectric layer in the terahertz wave detection device can be 90% or greater (the details will be described below). Accordingly, the terahertz wave is securely multiply-reflected between the metal structure and the metal layer, and thus, a resonance phenomenon can be generated.

According to the terahertz wave detection device with this configuration, a decrease of detection sensitivity due to electric noise can be suppressed.

Another aspect of the invention is directed to a terahertz wave detection device including an absorption portion which absorbs a terahertz wave, generates heat, and includes a metamaterial, and a conversion portion which converts the heat generated in the absorption portion into an electric signal.

According to the terahertz wave detection device, a decrease of detection sensitivity due to electric noise can be suppressed.

Still another aspect of the invention is directed to a camera including a terahertz wave generation portion which generates a terahertz wave, the terahertz wave detection device described above which detects the terahertz wave which is emitted from the terahertz wave generation portion and transmitted through an object, or the terahertz wave which is reflected by the object, and a storage portion which stores a detection result of the terahertz wave detection device.

According to the camera, since the camera includes the terahertz wave detection device according to the aspect of the invention, a decrease of detection sensitivity due to electric noise can be suppressed.

Yet another aspect of the invention is directed to an imaging device including a terahertz wave generation portion which generates a terahertz wave, the terahertz wave detection device described above which detects the terahertz wave which is emitted from the terahertz wave generation portion and transmitted through an object, or the terahertz wave which is reflected by the object, and an image forming portion which generates an image of the object based on a detection result of the terahertz wave detection device.

According to the imaging device, since the imaging device includes the terahertz wave detection device according to the aspect of the invention, a decrease of detection sensitivity due to electric noise can be suppressed.

Still yet another aspect of the invention is directed to a measuring device including a terahertz wave generation portion which generates a terahertz wave, the terahertz wave detection device described above which detects the terahertz wave which is emitted from the terahertz wave generation portion and transmitted through an object, or the terahertz wave which is reflected by the object, and a measuring portion which measures the object based on a detection result of the terahertz wave detection device.

According to the measuring device, since the measuring device includes the terahertz wave detection device according to the aspect of the invention, a decrease of detection sensitivity due to electric noise can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in details with reference to the drawings.

Moreover, the embodiments described below are not intended to limit the contents described in aspects of the invention. In addition, all configurations described below are not indispensable conditions in the configurations of the invention.

1. Terahertz Wave Detection Device

Figure 1:
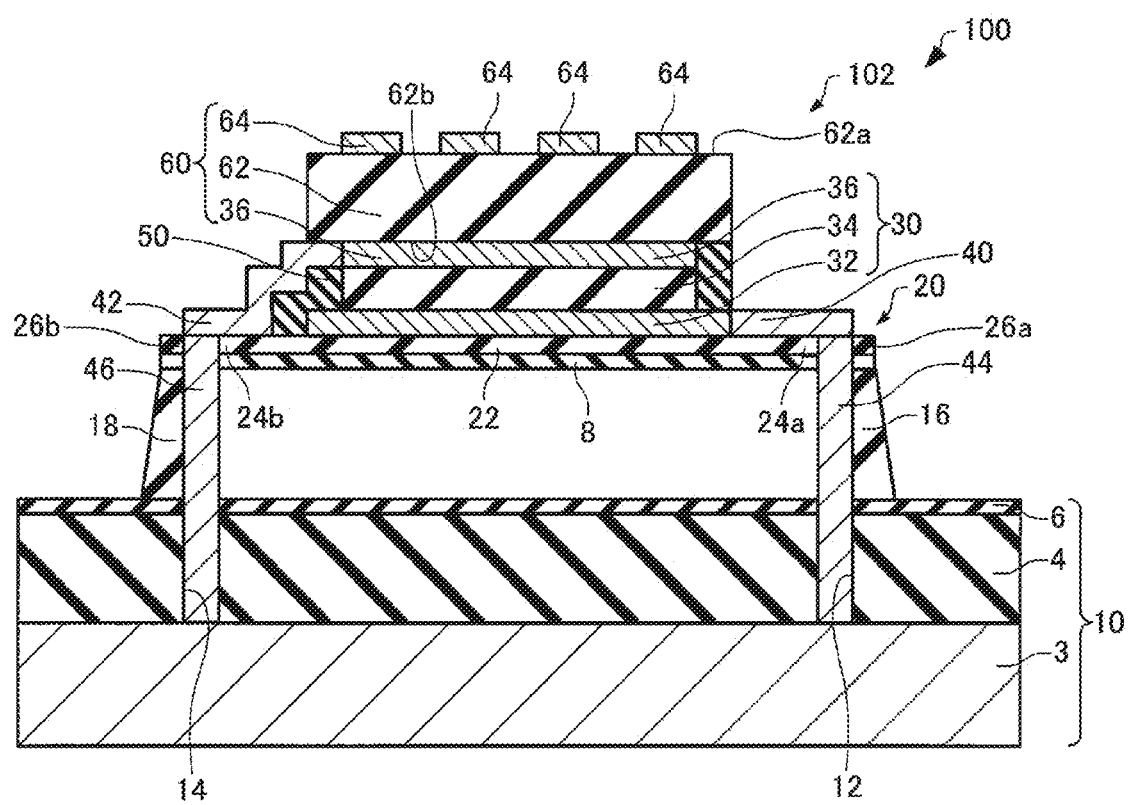
FIG. 1 is a cross-sectional view schematically showing a terahertz wave detection device according to an embodiment of the invention.
Figure 2:
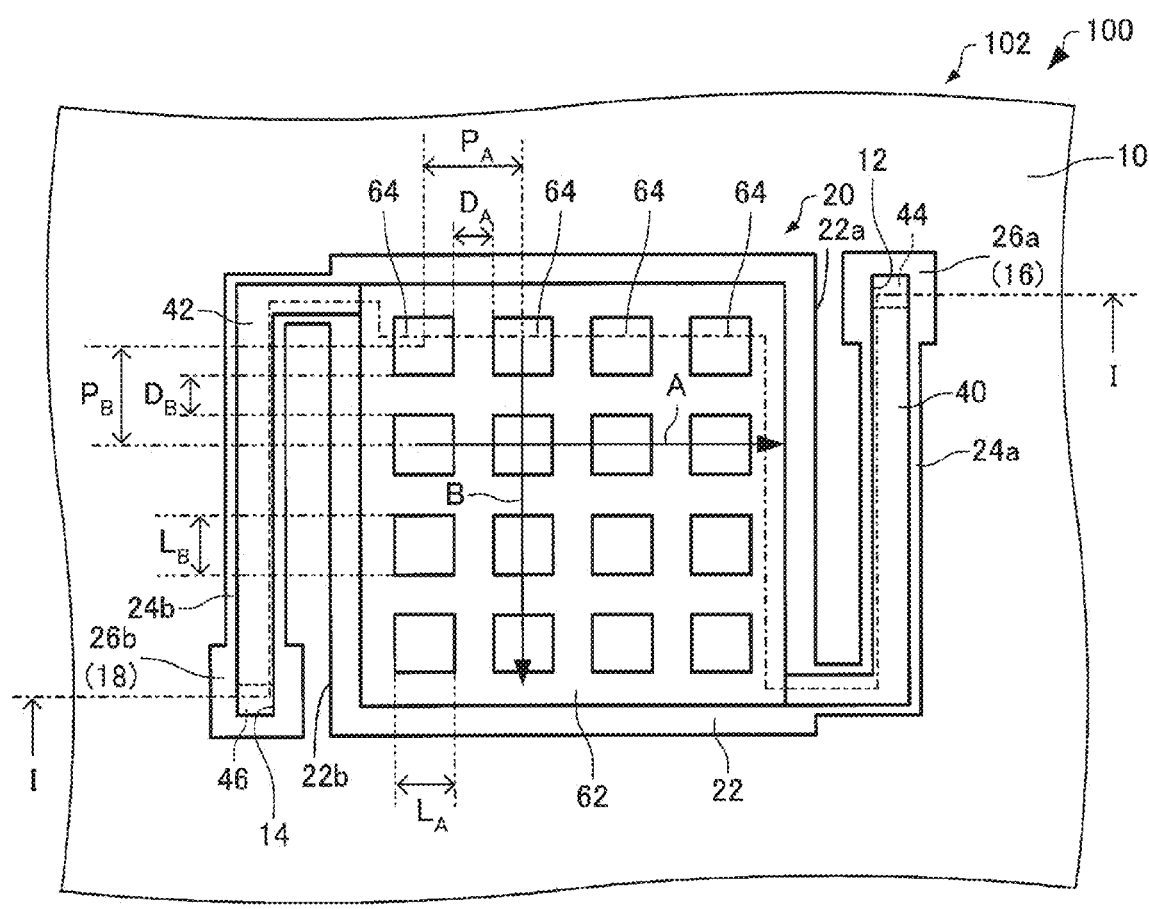
FIG. 2 is a plan view schematically showing the terahertz wave detection device according to the embodiment of the invention.
Figure 3:
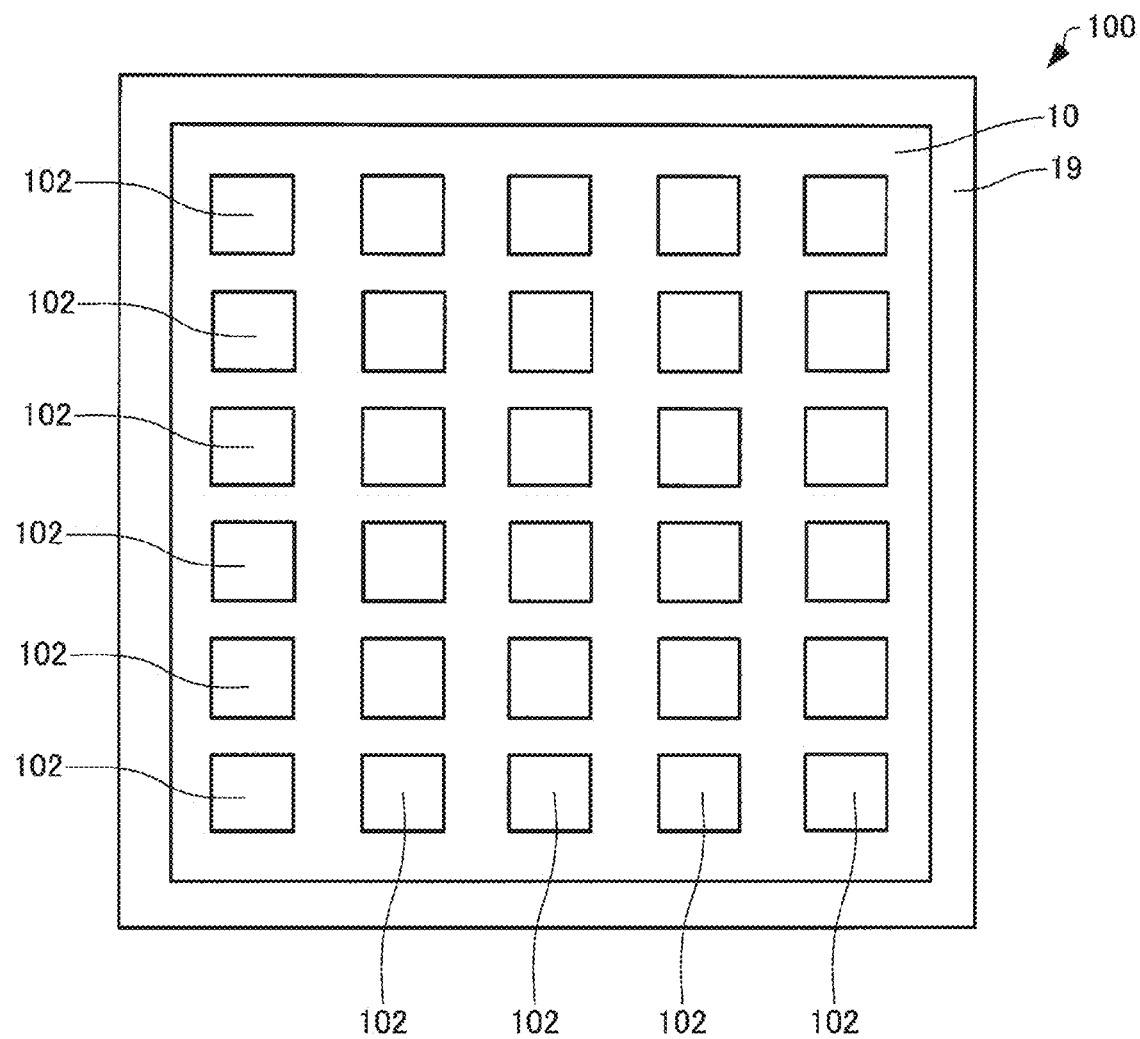
FIG. 3 is a plan view schematically showing the terahertz wave detection device according to the embodiment of the invention.

First, a terahertz wave detection device according to the embodiment will be described with reference to the drawings. FIG. 1 is a cross-sectional view schematically showing a terahertz wave detection element 102 of a terahertz wave detection device 100 according to a first embodiment. FIG. 2 is a plan view schematically showing the terahertz wave detection element 102 of the terahertz wave detection device 100 according to the first embodiment. FIG. 3 is a plan view schematically showing the terahertz wave detection device 100 according to the first embodiment. Moreover, FIG. 1 is a cross-sectional view taken along a line I-I of FIG. 2. In addition, for convenience, in FIG. 3, the terahertz wave detection element 102 which is illustrated is simplified.

As shown in FIGS. 1 to 3, the terahertz wave detection device 100 includes a substrate 10 and the terahertz wave detection element 102. The terahertz wave detection element 102 includes a conversion portion 30 and an absorption portion 60. Moreover, the terahertz wave detection element 102 may include pillar portions 16 and 18, a membrane 20, wiring layers 40 and 42, contact portions 44 and 46, and an insulating layer 50.

The substrate 10 has a flat plate shape. The substrate 10 includes a support substrate 3, an interlayer insulating layer 4, and a first protective layer 6. For example, a material of the support substrate 3 is silicon. The interlayer insulating layer 4 is provided on the support substrate 3. For example, a material of the interlayer insulating layer 4 is silicon oxide. The first protective layer 6 is provided on the interlayer insulating layer 4. For example, a material of the first protective layer 6 is aluminum oxide (alumina). The first protective layer 6 can protect the interlayer insulating layer 4 when a sacrifice layer 70 described below is etched.

The terahertz wave detection element 102 is provided on the substrate 10. A plurality of terahertz wave detection elements 102 may be provided. Further, the number of the terahertz wave detection elements is not particularly limited. In an example shown in FIG. 3, the terahertz wave detection elements 102 are arranged in a matrix form. In the plurality of terahertz wave detection elements 102, the wavelengths of the detected terahertz waves may be the same as one another or may be different from one another.

The pillar portions 16 and 18 are provided on the substrates 10. The pillar portions 16 and 18 are separated from each other. For example, the materials of the pillar portions 16 and 18 are silicon oxide. The pillar portions 16 and 18 can support the membrane 20. Moreover, as shown in FIG. 3, a frame 19 may be provided around the plurality of terahertz wave detection elements 102 on the substrate 10. For example, the material of the frame 19 is the same as the materials of the pillar portions 16 and 18.

The membrane 20 is supported on the substrate 10 by the pillar portions 16 and 18. For example, the membrane 20 includes a three-layer structure of silicon dioxide, silicon nitride, and silicon dioxide. In the shown example, a second protective layer 8 is provided below the membrane 20. For example, a material of the second protective layer 8 is aluminum oxide. The second protective layer 8 can protect the membrane 20 when the sacrifice layer 70 described below is etched. The membrane 20 includes a support portion 22, arm portions 24a and 24b, and fixing portions 26a and 26b.

For example, the support portion 22 has a flat plate shape, and in the example shown in FIG. 2, the support portion 22 has a square planar shape. The support portion 22 can support the conversion portion 30 and the absorption portion 60.

The first arm portion 24a connects the support portion 22 and the first fixing portion 26a. The second arm portion 24b connects the support portion 22 and the second fixing portion 26b. As shown in FIG. 2, the arm portions 24a and 24b extend in directions opposite each other from surfaces 22a and 22b of the support portion 22 facing each other, are perpendicularly curved, and reach the fixing portions 26a and 26b.

The arm portions 24a and 24b and the support portion are provided to be separated from the substrate 10. Accordingly, the conversion portion 30 and the absorption portion 60 can be thermally separated from the substrate 10. Therefore, transfer of heat among the plurality of terahertz wave detection elements 102 can be suppressed.

The fixing portions 26a and 26b are provided on the pillar portions 16 and 18. Specifically, the first fixing portion 26a is fixed onto the first pillar portion 16, and the second fixing portion 26b is fixed onto the second pillar portion 18. In the example shown in FIG. 2, the fixing portions 26a and 26b have square planar shapes.

As shown in FIG. 1, the conversion portion 30 is provided on the support portion 22. The conversion portion 30 can convert heat generated in the absorption portion 60 into electric signals (the details will be described below). The conversion portion 30 includes a metal layer 32, a pyroelectric body layer 34, and a metal layer 36.

The metal layer 32 is provided on the support portion 22. For example, the metal layer 32 has a three-layer structure in which an iridium layer, an iridium oxide layer, and a platinum layer are successively laminated on the support portion 22 side.

The pyroelectric body layer 34 is provided on the metal layer 32. A material of the pyroelectric body layer 34 is dielectric so as to exert pyroelectric effects. Specifically, the material of the pyroelectric body layer 34 is lead zirconate titanate (PZT). The pyroelectric body layer 34 may generate a change of an electric polarization amount according to a temperature change.

The metal layer 36 is provided on the pyroelectric body layer 34. For example, the metal layer 36 has a three-layer structure in which a platinum layer, an iridium oxide layer, and an iridium layer are successively laminated on the pyroelectric body layer 34 side.

Moreover, the materials of the metal layers 32 and 36 are not limited to the above-described example. For example, the material of the metal layers may be a metal such as gold, copper, iron, aluminum, zinc, chromium, lead, or titanium, or alloy such as nichrome. For example, thicknesses of the metal layers 32 and 36 are 1 nm or greater and 1 µm or less.

In the conversion portion 30, current flows to metal layers 32 and 36 according to the pyroelectric effects of the pyroelectric body layer 34. That is, the current corresponding to the change in the electric polarization amount of the pyroelectric body layer 34 according to the temperature change of the pyroelectric body layer 34 flows to metal layers 32 and 36 as pyroelectric current. That is, the conversion portion 30 is a pyroelectric sensor. In this way, the conversion portion 30 can convert the temperature change (more specifically, the heat generated in the absorption portion 60) into electric signals.

The first wiring layer 40 is provided on the first arm portion 24a. The first wiring layer 40 is connected to the metal layer 32 and the first contact portion 44. The first contact portion 44 is provided in a first contact hole 12 which is formed in the first fixing portion 26a, the second protective layer 8, the first pillar portion 16, the first protective layer 6, and the interlayer insulating layer 4.

The second wiring layer 42 is provided on the second arm portion 24b and the insulating layer 50. The second wiring layer 42 is connected to the metal layer 36 and the second contact portion 46. The second contact portion 46 is provided in a second contact hole 14 which is formed in the second fixing portion 26b, the second protective layer 8, the second pillar portion 18, the first protective layer 6, and the interlayer insulating layer 4.

For example, the contact portions 44 and 46 are electrically connected to a circuit portion (not shown) which is provided on the support substrate 3. That is, the metal layers 32 and 36 are electrically connected to the circuit portion, and the current (electric signals) flowing to the metal layers 32 and 36 according to the pyroelectric effects of the pyroelectric body layer 34 can reach the circuit portion. In the circuit portion, terahertz waves can be detected from the electric signals.

Materials of the wiring layers 40 and 42 and the contact portions 44 and 46 are not particularly limited as long as they are conductive. The wiring layers 40 and 42 may be wire-bonded.

The insulating layer 50 is provided on the metal layer 32 and the membrane 20. In the shown example, the insulating layer 50 is provided between the metal layer 32 and the second wiring layer 42. A material of the insulating layer 50 is not particularly limited as long as it is conductive, and for example, is silicon oxide. The insulating layer 50 can electrically separate the metal layer 32 and the second wiring layer 42. Moreover, the insulating layer 50 may be integrally formed with the dielectric layer 62 of the absorption portion 60.

The absorption portion 60 is provided on the conversion portion 30. In the absorption portion 60, the terahertz waves are absorbed, and thus, heat can be generated (the details will be described below). The absorption portion 60 includes the metal layer 36, the dielectric layer 62, and metal structures 64.

The metal layer 36 of the absorption portion 60 and the metal layer 36 of the conversion portion 30 are common metal layers. That is, the metal layer 36 is the metal layer to which current flows according to the pyroelectric effects of the pyroelectric body layer 34, and is the metal layer for making the terahertz wave resonate between the metal layer 36 and the metal structures 64. Accordingly, it is possible to reduce the number of components in the terahertz wave detection device 100, and a reduction of costs can be realized.

In addition, although it is not shown, the metal layer 36 may not be the common metal layer in the absorption portion 60 and the conversion portion 30. That is, the absorption portion 60 and the conversion portion 30 may have metal layers which are different from each other.

The dielectric layer 62 is provided on the metal layer 36. For example, a thickness of the dielectric layer 62 is greater than or equal to 10 nm or greater and less than or equal to 10 µm. For example, a relative dielectric constant of the dielectric layer 62 between 2 and 100. For example, the dielectric layer 62 is an oxidation titanium layer, a polyimide layer, a silicon nitride layer, an aluminum oxide layer, or a laminated body thereof.

The metal structures 64 are provided on the dielectric layer 62. The metal structures 64 and the metal layer 36 interpose the dielectric layer 62 therebetween. That is, the metal structures 64 are provided on one surface (upper surface, a first surface) 62a of the dielectric layer 62, and the metal layer 36 is provided on the other surface (lower surface, a second surface) 62b of the dielectric layer 62.

In a plan view (when viewed from a direction in which the dielectric layer 62 and the metal layer 36 are laminated) as shown in FIG. 2, the plurality of metal structures 64 are arranged to be separated from one another by pitches $P_A$ in a first direction A. The pitch $P_A$ is shorter than a wavelength of the terahertz wave which is absorbed by the absorption portion 60. That is, a gap $D_A$ between the metal structures 64 adjacent to each other in the first direction A and a size $L_A$ in the first direction A of the metal structure 64 are smaller than the wavelength of the terahertz wave which is absorbed by the absorption portion 60.

Here, for example, the "pitch" indicates a distance between a center of one metal structure 64 and a center of another adjacent metal structure 64 in a plan view. In other words, in the plurality of metal structures 64 which are disposed with an interval having a predetermined length, the pitch is the interval having the length. That is, the plurality of metal structures 64 are arranged to be separated from one another by an interval having the predetermined length, where the interval having the predetermined length of the metal structures 64 is shorter than the wavelength of the terahertz wave which is absorbed by the absorption portion 60. Moreover, for example, the "first direction" is a direction along a virtual straight line in which a distance between centers of the metal structures 64 adjacent to each other becomes minimal among directions along virtual straight lines passing through centers of the plurality of metal structures 64 in a plan view.

The plurality of metal structures 64 are arranged to be separated from one another by pitches $P_B$ in a second direction B intersecting (in the example shown in FIG. 2, orthogonal to) the first direction A. The pitch $P_B$ is shorter than the wavelength of the terahertz wave which is absorbed by the absorption portion 60. That is, a gap $D_B$ between the metal structures 64 adjacent to each other in the second direction B and a size $L_B$ in the second direction B of the metal structure 64 are smaller than the wavelength of the terahertz wave which is absorbed by the absorption portion 60.

Moreover, for example, not only the pitch $P_A$ and the pitch $P_B$, but also a pitch of the metal structures 64 of the direction inclined by 45° with respect to the first direction A in a plan view may be shorter than the wavelength of the terahertz wave which is absorbed by the absorption portion 60.

As shown in FIG. 2, the pitch $P_A$ and the pitch $P_B$ of the metal structures 64 may be the same as each other. That is, the metal structures 64 may be arranged in a matrix form with equal intervals in the first direction A and the second direction B. In addition, the gap $D_A$ and the gap $D_B$ may be the same as each other, and the size $L_A$ and the size $L_B$ may be the same as each other. In the example shown in FIG. 2, the metal structure 64 is a square which has sides parallel in the first direction A and the second direction B. For example, the gaps $D_A$ and $D_B$ are 1 μm or greater and 100 μm or less. For example, the sizes $L_A$ and $L_B$ are 1 μm or greater and 100 μm or less. For example, the thickness of the metal structure 64 may be greater than or equal to 1 nm and less than or equal to 1 μm. For example, the material of the metal structure 64 may be a metal such as gold, copper, iron, aluminum, zinc, chromium, lead, or titanium, or alloy such as nichrome.

As described above, the absorption portion 60 includes the metal layer 36, the dielectric layer 62, and the metal structures 64 formed of a metamaterial. Here, the "metamaterial" indicates an artificial material in which unit structures (specifically, metal structures 64) sufficiently smaller than the wavelengths of electromagnetic waves (terahertz waves) are periodically arranged and which is configured to be operated as a homogeneous medium with respect to the electromagnetic waves. In the metamaterial, the physical properties (permittivity and permeability) can be freely adjusted according to the structure and disposition of the unit structure.

In the absorption portion 60, the terahertz waves are absorbed, and thus, heat can be generated. Hereinafter, this principle will be described.

As described above, the plurality of metal structures 64 of the absorption portion 60 are arranged in the first direction A to be separated from one another by the pitches $P_A$ which are shorter than the wavelengths of the terahertz waves. Accordingly, when the terahertz waves are radiated to the absorption portion 60, for example, polarized waves of the terahertz waves, in which vibration directions of electric fields are the first direction A, enter the dielectric layer 62 between the metal structures 64 and the metal layer 36, and can be multiply-reflected between the metal structures 64 and the metal layer 36. More specifically, the terahertz waves are multiply-reflected between the contact surfaces of the metal structures 64 with the dielectric layer 62 and the contact surface of the metal layer 36 with the dielectric layer 62, a resonance phenomenon is generated, and standing waves are generated. The frequency (resonance frequency) of the resonating terahertz waves can be appropriately changed according to the shapes or the sizes of the metal structures 64. In this way, in the terahertz wave detection device 100, the terahertz waves can be confined in the absorption portion 60.

The terahertz waves, which are confined in the absorption portion 60, are multiply-reflected between the metal structures 64 and the metal layer 36 which interpose the dielectric layer 62 therebetween, a dielectric loss is generated in the dielectric layer 62, and accordingly, heat is generated. Moreover, atoms and electrons which configure the contact surfaces of the metal structures 64 with the dielectric layer 62, and atoms and electrons which configure the contact surface of the metal layer 36 with the dielectric layer 62 are vibrated, and accordingly, heat is generated. That is, absorption portion 60 absorbs the terahertz waves and can generate heat.

The heat, which is generated in the absorption portion 60, is transferred to the conversion portion 30, and as described above, the heat is converted into electric signals in the conversion portion 30. In this way, in the terahertz wave detection device 100, the terahertz waves can be detected as electric signals.

In addition, as described above, for example, the plurality of metal structures 64 are arranged with the pitches $P_A$ shorter than the wavelengths of the terahertz waves not only in the first direction A but also in the second direction B or the direction inclined by 45° with respect to the first direction A, and thus, independently of the directions of the polarized waves, the terahertz waves are multiply-reflected between the metal structure 64 and the metal layer 36, and a resonance phenomenon can be generated.

In addition, in the terahertz wave detection device 100, in the metal structures 64 adjacent to one another, electric coupling is generated across the standing waves generated between one metal structure 64 and the metal layer 36 and the standing waves generated between another metal structure 64 and the metal layer 36. Accordingly, absorptivity of the terahertz waves in the absorption portion 60 can be improved. In addition, the absorptivity of the terahertz waves in the absorption portion 60 can be appropriately changed according to the shapes or the sizes of the metal structures 64.

Moreover, in the terahertz wave detection device 100, the terahertz waves are multiply-reflected not only between the metal structures 64 and the metal layer 36 but also between the metal structures 64 adjacent to one another, and a resonance phenomenon is generated.

As described above, the frequency (resonance frequency) of the terahertz wave resonating in the absorption portion 60 can be appropriately changed according to the shapes or the sizes of the metal structures 64. That is, by changing the shapes or the sizes of the metal structures 64, the wavelengths of the terahertz waves (detected wavelengths of the terahertz waves) which are absorbed by the absorption portion 60 can be selected. For example, by forming an opening at the center of the square metal structure 64 shown in FIG. 2, the wavelengths of the absorbed terahertz waves can be changed.

Here, if the following expression (1) is satisfied in the metal structure 64 having a square planar shape in which the length of one side is L, the absorptivity of the terahertz waves in the absorption portion 60 can be improved.

$$L = \frac{\lambda}{2\sqrt{\varepsilon_r}} \quad (1)$$

Here, $\lambda$ is the wavelength of the absorbed terahertz wave and $\varepsilon_r$ is the relative dielectric constant of the dielectric layer 62.

It is preferable that a sheet resistance of the metal structure 64 configuring the absorption portion 60 and a sheet resistance of the metal layer 36 be 10 $\Omega/\square$ or less. Accordingly, the reflectance of the terahertz waves on the contact surfaces of the metal structures 64 with the dielectric layer 62 and the contact surface of the metal layer 36 with the dielectric layer 62 can be 90% or greater, as is described more fully below.

In general, a complex refractive index n' can be represented by following expression (2).

$$n' = n + ik \quad (2)$$

Here, n is the real part of the refractive index and can be represented by the following expression (3). In addition, k is the imaginary part of the refractive index and can be represented by the following expression (4).

$$n = \frac{c}{\omega}\sqrt{\frac{\omega\mu_0}{2\rho}\left(\omega\varepsilon_0\rho + \sqrt{1 + (\omega\varepsilon_0\rho)^2}\right)^{1/2}} \quad (3)$$

$$\kappa = \frac{c}{\omega}\sqrt{\frac{\omega\mu_0}{2\rho}\left(\omega\varepsilon_0\rho + \sqrt{1 + (\omega\varepsilon_0\rho)^2}\right)^{-1/2}} \quad (4)$$

Here, c is the speed of light, $\omega$ is an angular frequency ($\omega = (2\pi c)/\lambda$), $\varepsilon_0$ is permittivity of vacuum, and $\mu_0$ is permeability of vacuum.

Resistivity $\rho$ can be represented by the following expression (5).

$$\rho = R_S \times t \quad (5)$$

Here, $R_S$ is the sheet resistance and t is the thickness.

Figure 4:
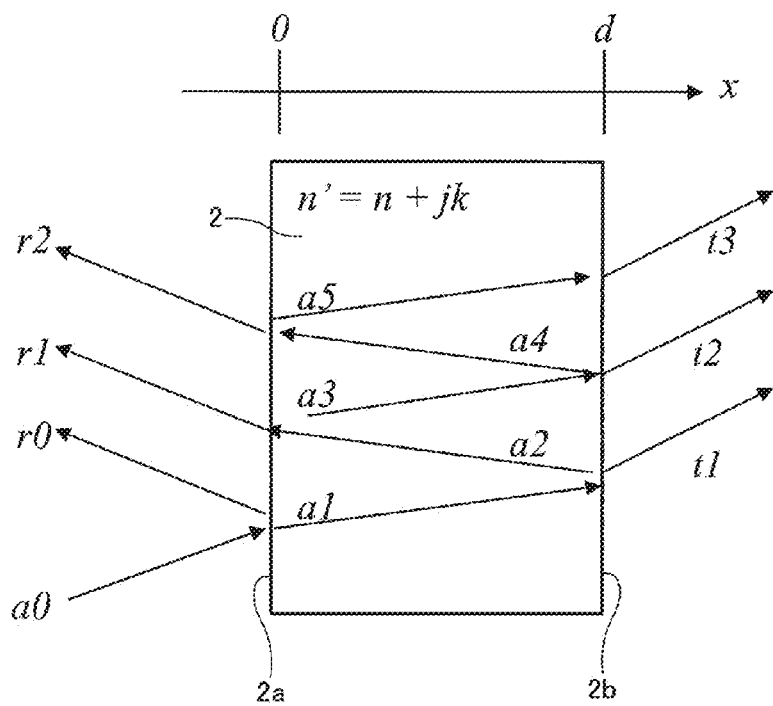
FIG. 4 is a view illustrating reflection on a metal film.

Here, FIG. 4 is a view for illustrating reflection on a metal film 2. As shown in FIG. 4, the metal film 2 includes a first surface 2a at a position 0 on an x axis and a second surface 2b at a position d on the x axis. That is, a thickness of the metal film 2 is d. The metal film 2 corresponds to the metal layer 36 or the metal structures 64.

As shown in FIG. 4, an incident wave a0 is divided into a reflection wave r0 which is reflected on the first surface 2a and a wave a1 which passes through the metal film 2 from the first surface 2a. The wave a1 is divided into a transmitted wave t1 which is emitted to the outside of the metal film 2 from the second surface 2b and a wave a2 which is reflected on the second surface 2b and passes through the metal film 2. The wave a2 is divided into a reflection wave r1 which is emitted to the outside of the metal film 2 from the first surface 2a and a wave a3 which is reflected on the first surface 2a and passes through the metal film 2. A model, in which the above-described operations are repeated m times, is assumed.

In the model, a reflection coefficient $r_0(x)$ of the reflection wave r0 can be represented by the following expression (6). Moreover, a reflection coefficient $r_m(x)$ of a reflection wave $r_m$ ($m \geq 1$) can be represented by the following expression (7).

$$r_0(x) = \frac{1 - n'}{1 + n'}\exp(ikx) \quad (6)$$

$$r_m(x) = \frac{4n'(n' - 1)^{2m-1}}{(n' + 1)^{2m+1}}\exp\{i(-kx + 2mk_c d)\} \quad (7)$$

Here, $k_c$ and k are wave numbers, and $k_c = (2\pi n')/\lambda$ and $k = (2\pi n)/\lambda$ are satisfied.

An infinite series $r_{all}(x)$ of the reflection coefficient can be represented by the following expression (8).

$$r_{all}(x) = \sum_{m=1}^{\infty}(r_0(x) + r_m(x)) \quad (8)$$

A reflectance R, which is a value when x=0 is satisfied, can be represented by the following expression (9).

$$R = r_{all}(0) \cdot r^*_{all}(0) \quad (9)$$

Here, $r^*_{all}(0)$ is a complex conjugate of $r_{all}(0)$.

Figure 5:
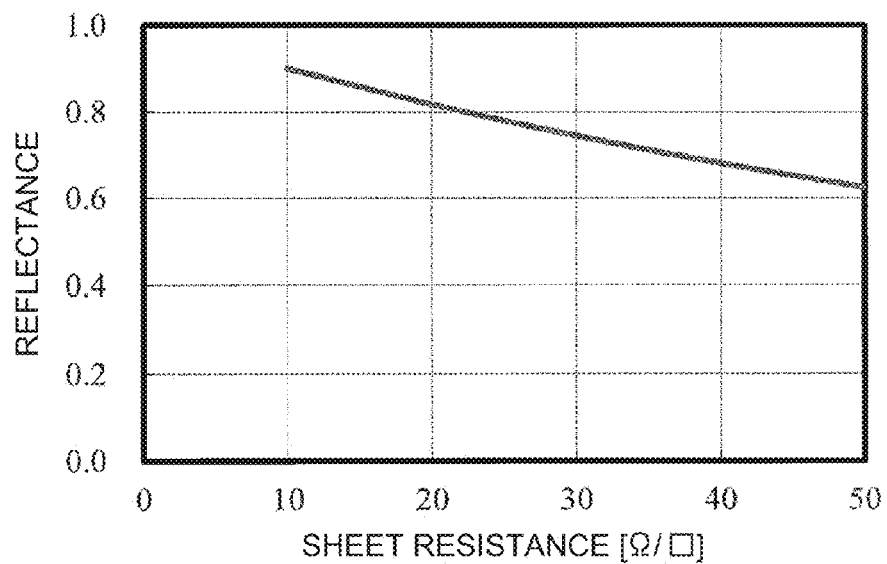
FIG. 5 is a graph showing a relationship between a sheet resistance and reflection.

FIG. 5 is a graph showing a relationship between the sheet resistance and the reflectance based on a relational expression between the reflectance R on the surface 2a and the sheet resistance $R_S$ of the metal film 2 which are calculated by Expression (2) to Expression (9). From FIG. 5, if the sheet resistance is 10 $\Omega/\square$ or less, it is understood that the reflectance becomes 90% or greater. That is, by setting the sheet resistance of the metal structure 64 and the sheet resistance of the metal layer 36 to be 10 $\Omega/\square$ or less, the reflectance of the terahertz wave on the contact surface of the metal structure 64 with the dielectric layer 62 and the contact surface of the metal layer 36 with the dielectric layer 62 can be 90% or greater. Table 1 shows the thickness of each metal in which the sheet resistance becomes 10 $\Omega/\square$. By setting the thickness of each metal to be equal to or greater than the thickness shown in Table 1, the sheet resistance of 10 $\Omega/\square$ or less can be obtained.

TABLE 1

| | Resistivity ρ [Ωm] | Thickness t [nm] |
|---|---|---|
| Au | $2.21 \times 10^{-8}$ | 2.21 |
| Al | $2.65 \times 10^{-8}$ | 2.65 |
| Zn | $6.02 \times 10^{-8}$ | 6.02 |
| Fe | $1.02 \times 10^{-8}$ | 10.2 |
| Cr | $1.29 \times 10^{-8}$ | 12.9 |
| Pb | $2.08 \times 10^{-8}$ | 20.8 |
| Ti | $5.81 \times 10^{-8}$ | 58.1 |

For example, the terahertz wave detection device 100 has the following characteristics.

According to the terahertz wave detection device 100, the device includes the absorption portion 60 which absorbs the terahertz waves and generates heat and the conversion portion 30 which converts the heat generated in the absorption portion 60 into electric signals. Accordingly, in the terahertz wave detection device 100, the electric signals due to the terahertz waves can be detected without applying current or voltage from the outside, and noise due to applying current or voltage does not occur. Therefore, in the terahertz wave detection device 100, a decrease of detection sensitivity due to the electric noise can be suppressed, and the device can have high detection sensitivity. Specifically, as described above, in the terahertz wave detection device 100, the terahertz waves are confined and are absorbed, and heat is generated in the absorption portion 60. In addition, the heat is converted into electric signals (pyroelectric current) by pyroelectric effects of the pyroelectric body layer 34 in the conversion portion 30, and thus, terahertz waves can be detected.

In addition, in the terahertz wave detection device 100, the absorption portion 60 includes the dielectric layer 62 and the metal structures 64 and the metal layer 36 which interpose the dielectric layer 62 therebetween, and the plurality of metal structures 64 are arranged to be separated from one another with the pitches which are shorter than the wavelengths of the absorbed terahertz waves. That is, the plurality of metal structures 64 are arranged to be separated from one another by the predetermined intervals, and the interval having the predetermined length in the metal structures 64 is shorter than the wavelengths of the terahertz waves which are absorbed by the absorption portion 60. Accordingly, as described above, in the terahertz wave detection device 100, the terahertz waves absorbed by the absorption portion 60 are multiply-reflected between the metal structures 64 and the metal layer 36, and thus, a resonance phenomenon can be generated. Therefore, absorptivity of the terahertz waves in the absorption portion 60 can be improved. Moreover, in the metal structures 64 adjacent to each other, coupling is generated across the standing waves generated between one metal structure 64 and the metal layer 36 and the standing waves generated between another metal structure 64 and the metal layer 36. Accordingly, the absorptivity of the terahertz waves in the absorption portion 60 can be improved.

As described above, in the terahertz wave detection device 100, a decrease of the detection sensitivity due to electric noise can be suppressed, and the detection device can have high detection sensitivity.

According to the terahertz wave detection device 100, the sheet resistances of the metal structures 64 and the sheet resistance of the metal layer 36 are 10 Ω/□ or less. Accordingly, as described above, the reflectance of the terahertz waves on the contact surfaces of the metal structures 64 with the dielectric layer 62 and the contact surface of the metal layer 36 with the dielectric layer 62 can be 90% or greater. Therefore, the terahertz waves can be securely multiply-reflected between the metal structures 64 and the metal layer 36, and thus, a resonance phenomenon can be generated.

2. Manufacturing Method of Terahertz Wave Detection Device

Next, a manufacturing method of the terahertz wave detection device according to the embodiment will be described with reference to the drawings. FIGS. 6 to 12 are cross-sectional views schematically showing a manufacturing process of the terahertz wave detection device 100 according to the embodiment, and correspond to FIG. 1.

Figure 6:
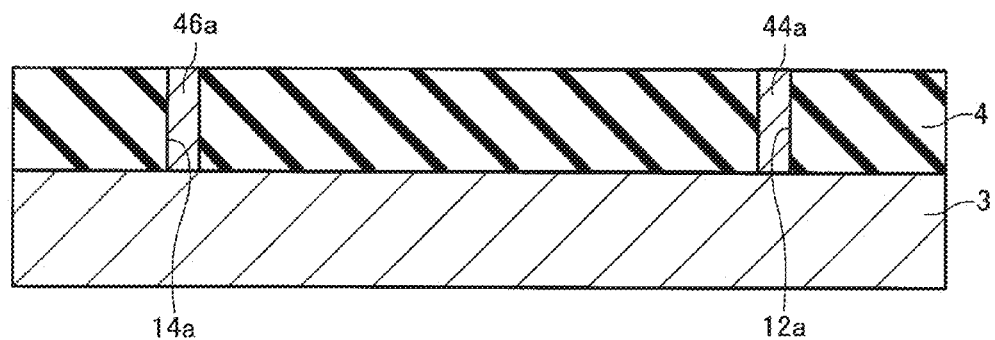
FIG. 6 is a cross-section view schematically showing a manufacturing process of the terahertz wave detection device according to the embodiment of the invention.

As shown in FIG. 6, the interlayer insulating layer 4 is formed on the support substrate 3. For example, the interlayer insulating layer 4 is formed using a Chemical Vapor Deposition (CVD) method.

Subsequently, the interlayer insulating layer 4 is patterned (patterned by photolithography and etching), and contact holes 12a and 14a are formed. Subsequently, contact portions 44a and 46a are formed in the contact holes 12a and 14a, respectively. For example, the contact portions 44a and 46a are formed using a plating method or a sputtering method.

Figure 7:
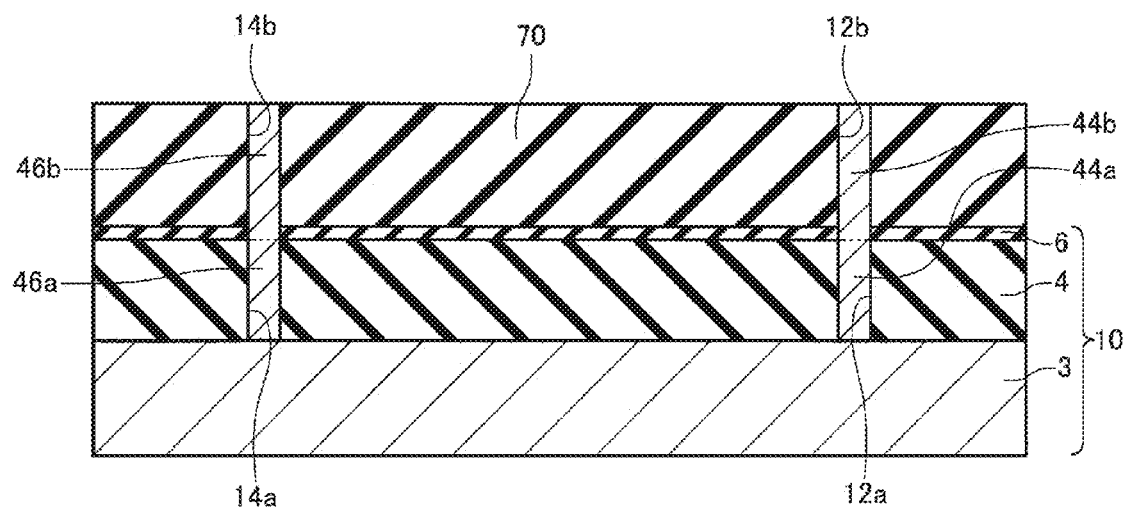
FIG. 7 is a cross-section view schematically showing a manufacturing process of the terahertz wave detection device according to the embodiment of the invention.

As shown in FIG. 7, the first protective layer 6 is formed on the interlayer insulating layer 4. For example, the first protective layer 6 is formed using the CVD method or the sputtering method. Accordingly, the substrate 10, which includes the support substrate 3, the interlayer insulating layer 4, and the first protective layer 6, can be formed. Subsequently, a sacrifice layer 70 is formed on the first protective layer 6. For example, the sacrifice layer 70 is formed using the CVD method. For example, the material of the sacrifice layer 70 is silicon oxide.

Subsequently, the sacrifice layer 70 and the first protective layer 6 are patterned, and contact holes 12b and 14b are formed. The contact holes 12b and 14b are formed respectively so that the contact portions 44a and 46a are exposed. Subsequently, contact portions 44b and 46b are formed in the contact holes 12b and 14b, respectively. The contact portions 44b and 46b are formed to be connected to the contact portions 44a and 46a, respectively. For example, the contact portions 44b and 46b are formed using the plating method or the sputtering method.

Figure 8:
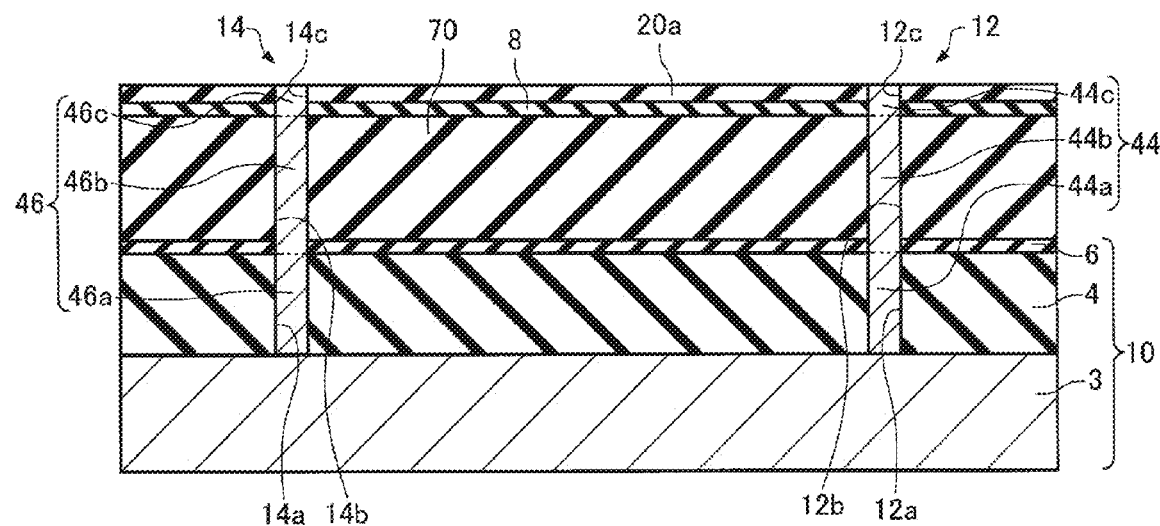
FIG. 8 is a cross-section view schematically showing a manufacturing process of the terahertz wave detection device according to the embodiment of the invention.

As shown in FIG. 8, the second protective layer 8 is formed on the sacrifice layer 70. For example, the second protective layer 8 is formed using the CVD method or the sputtering method. Subsequently, a membrane 20a which becomes the membrane 20 is formed on the second protective layer 8. For example, the membrane 20a is formed using the CVD method or the sputtering method.

Subsequently, the second protective layer 8 and the membrane 20a are patterned, and contact holes 12c and 14c are formed. The contact holes 12c and 14c are formed respectively so that the contact portions 44b and 46b are exposed. Subsequently, contact portions 44c and 46c are formed in the contact holes 12c and 14c, respectively. The contact portions 44c and 46c are formed to be connected to the contact portions 44b and 46b, respectively. For example, the contact portions 44c and 46c are formed using the plating method and the sputtering method.

According to the above-described processes, the first contact hole 12 including the contact holes 12a, 12b, and 12c and the second contact hole 14 including the contact holes 14a, 14b, and 14c can be formed. Moreover, the first contact portion 44 including the contact portions 44a, 44b, and 44c and the second contact portion 46 including the contact portions 46a, 46b, and 46c can be formed.

Figure 9:
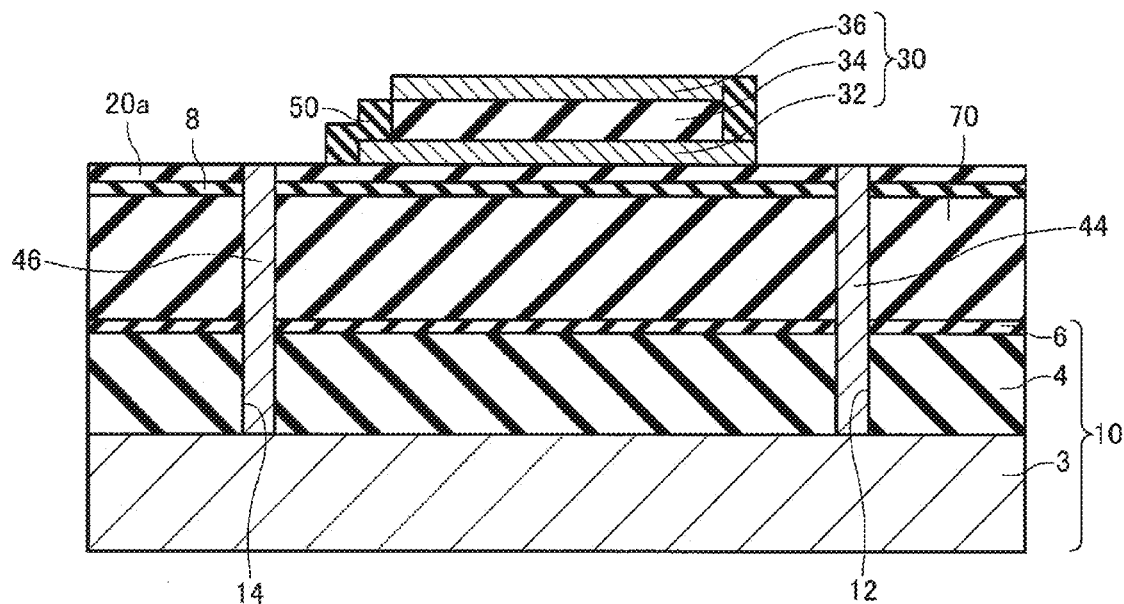
FIG. 9 is a cross-section view schematically showing a manufacturing process of the terahertz wave detection device according to the embodiment of the invention.

As shown in FIG. 9, the metal layer 32, the pyroelectric body layer 34, and the metal layer 36 are formed on the membrane 20a in the above order. Accordingly, the conversion portion 30 can be formed. For example, the metal layers 32 and 36 are formed by film formation using the sputtering method, and patterning. For example, the pyroelectric body layer 34 is formed by film formation using the sputtering method or a sol-gel method and patterning.

Subsequently, the insulating layer 50 is formed on the metal layer 32 and the membrane 20a. For example, the insulating layer 50 is formed by film formation using the sputtering method or the CVD method, and patterning.

Figure 10:
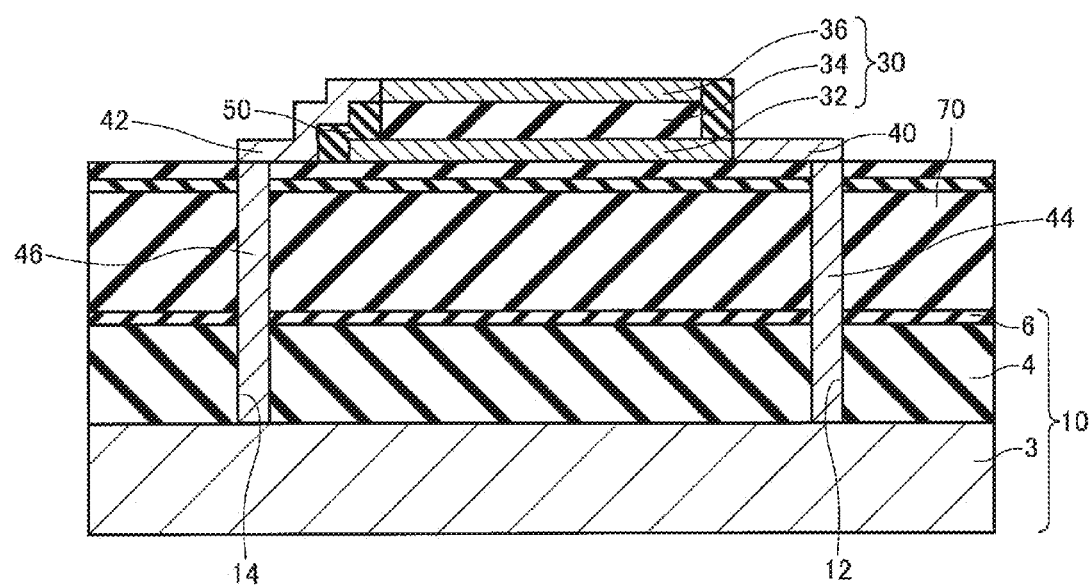
FIG. 10 is a cross-section view schematically showing a manufacturing process of the terahertz wave detection device according to the embodiment of the invention.

As shown in FIG. 10, the first wiring layer 40 is formed on the membrane 20a, and the metal layer 32 and the first contact portion 44 are electrically connected to each other. Moreover, the second wiring layer 42 is formed on the membrane 20a and the insulating layer 50, and the metal layer 36 and the second contact portion 46 are electrically connected to each other. For example, the wiring layers 40 and 42 are formed using the plating method or the sputtering method.

Figure 11:
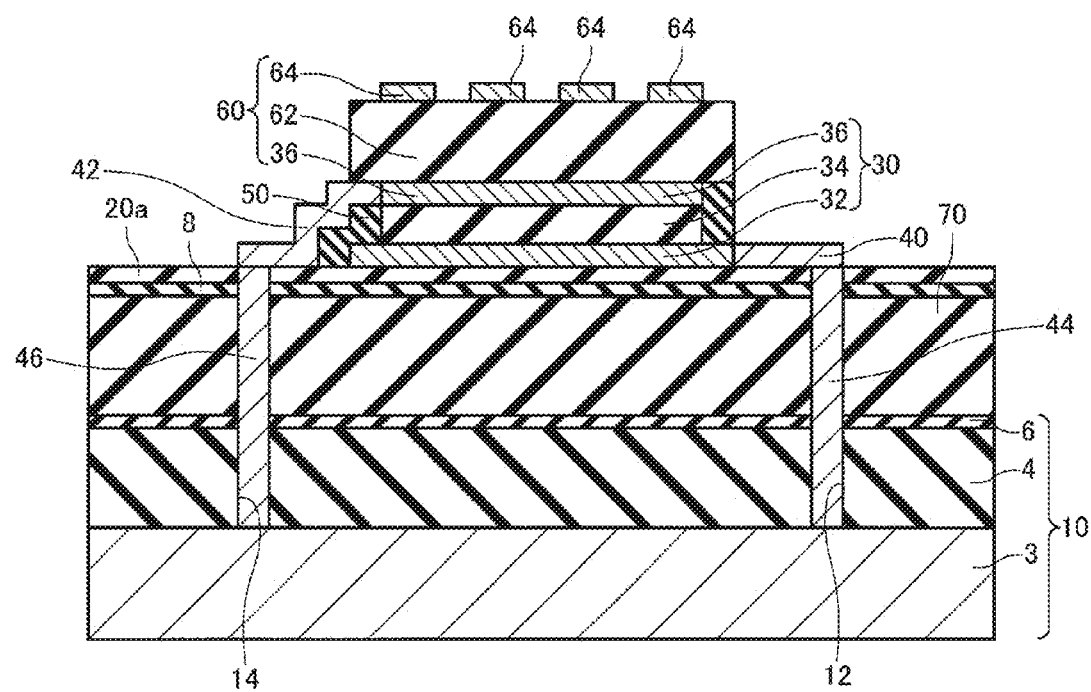
FIG. 11 is a cross-section view schematically showing a manufacturing process of the terahertz wave detection device according to the embodiment of the invention.

As shown in FIG. 11, the dielectric layer 62 and the metal structures 64 are formed on the metal layer 36 in the above order. Accordingly, the absorption portion 60 can be formed. For example, the dielectric layer 62 is formed by film formation using the CVD method, and patterning. For example, the metal structures 64 are formed by film formation using the sputtering method, and patterning. Moreover, by also forming the insulating layer 50 on the metal layer 36, the dielectric layer 62 and the insulating layer 50 can be integrally formed.

Figure 12:
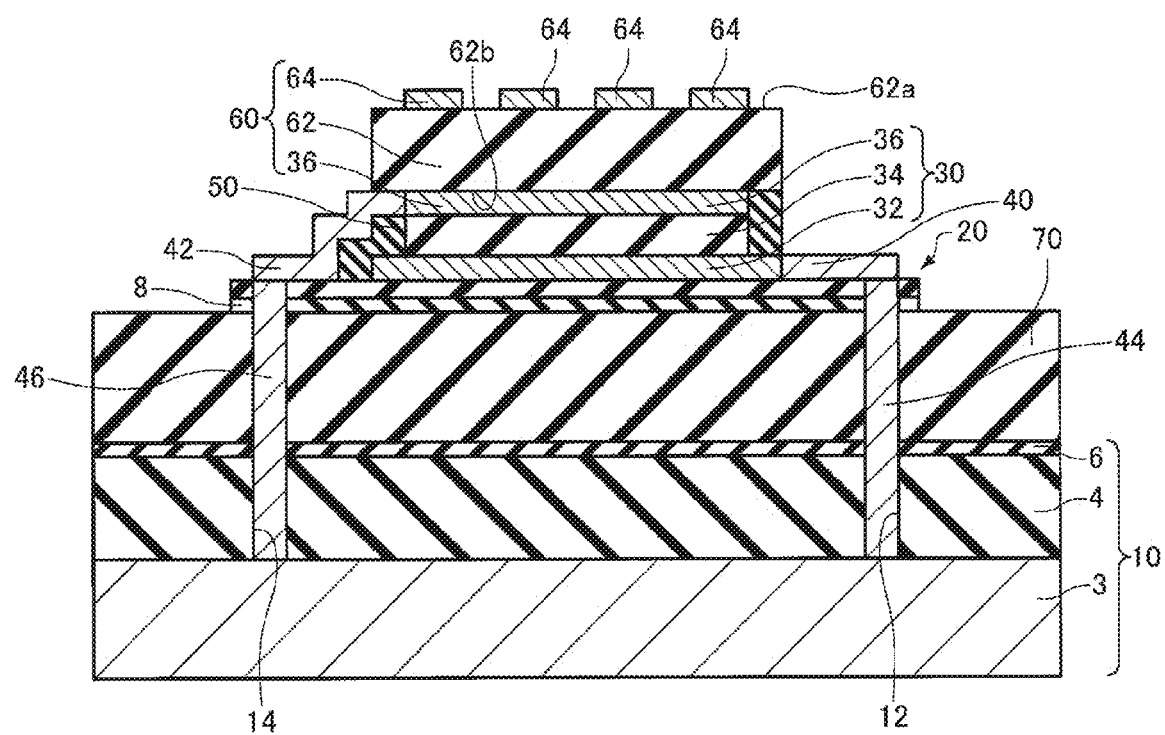
FIG. 12 is a cross-section view schematically showing a manufacturing process of the terahertz wave detection device according to the embodiment of the invention.

As shown in FIG. 12, the membrane 20a and the second protective layer 8 are patterned. Accordingly, the membrane 20 including the support portion 22, the arm portions 24a and 24b, and fixing portions 26a and 26b can be formed.

As shown in FIG. 1, the sacrifice layer 70 is removed. For example, the removal of the sacrifice layer 70 is performed by etching with the membrane 20 as a mask. Accordingly, the pillar portions 16 and 18 are formed. Moreover, the frame 19 (refer to FIG. 3) is formed concurrently with the pillar portions 16 and 18.

According to the above-described processes, the terahertz wave detection device 100 can be manufactured.

Figure 13:
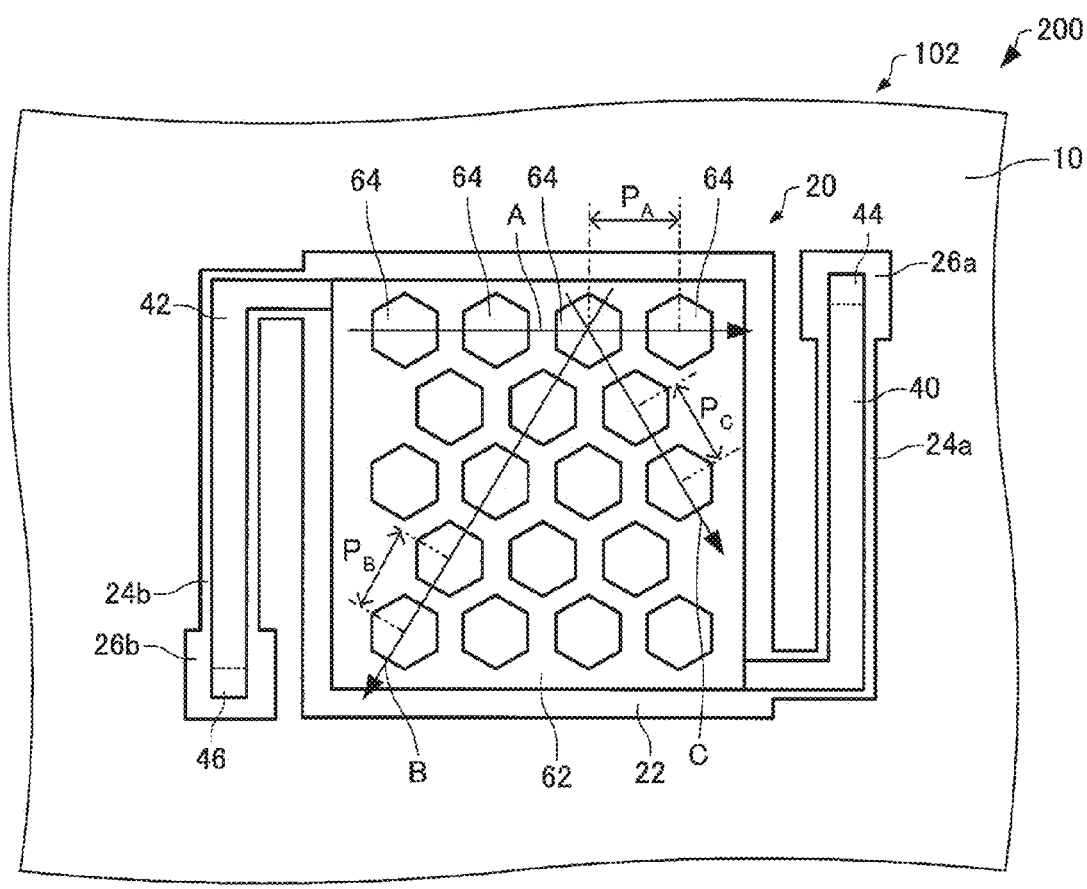
FIG. 13 is a plan view schematically showing a terahertz wave detection device according to a second embodiment of the invention.

3. Additional Embodiments of the Terahertz Wave Detection Device 3.1 Second Embodiment Next, a terahertz wave detection device according to a first modification example, or second embodiment will be described with reference to the drawings. FIG. 13 is a plan view schematically showing a terahertz wave detection device 200 according to the first modification as is shown in the second embodiment, and corresponds to FIG. 2.

Hereinafter, in the terahertz wave detection device 200 according to the second embodiment, the same reference numerals are attached to members having the same functions as the component members of the terahertz wave detection device 100 according to the first embodiment, and the detailed descriptions thereof are omitted. This is also applied similarly to a terahertz wave detection device 200 according to a third embodiment described below.

As shown in FIG. 2, in the terahertz wave detection device 100, the metal structures 64 have square planar shapes. In contrast, as shown in FIG. 13, in the terahertz wave detection device 200, the metal structures 64 have hexagonal planar shapes. The metal structures 64 of the terahertz wave detection device 200 are arranged in a honeycomb structure in a plan view. Accordingly, for example, the metal structures 64 can be densely disposed.

In the terahertz wave detection device 200, the pitch $P_A$ in the first direction A of the metal structures 64, the pitch $P_B$ in the second direction B inclined by 60° with respect to the first direction A, and a pitch $P_C$ in a third direction C inclined by 120° with respect to the first direction A are the same as one other. Therefore, compared to terahertz wave detection device 100, according to the terahertz wave detection device 200, the terahertz waves can be detected independently of the directions of the polarized waves.

3.2 Third Embodiment

Figure 14:
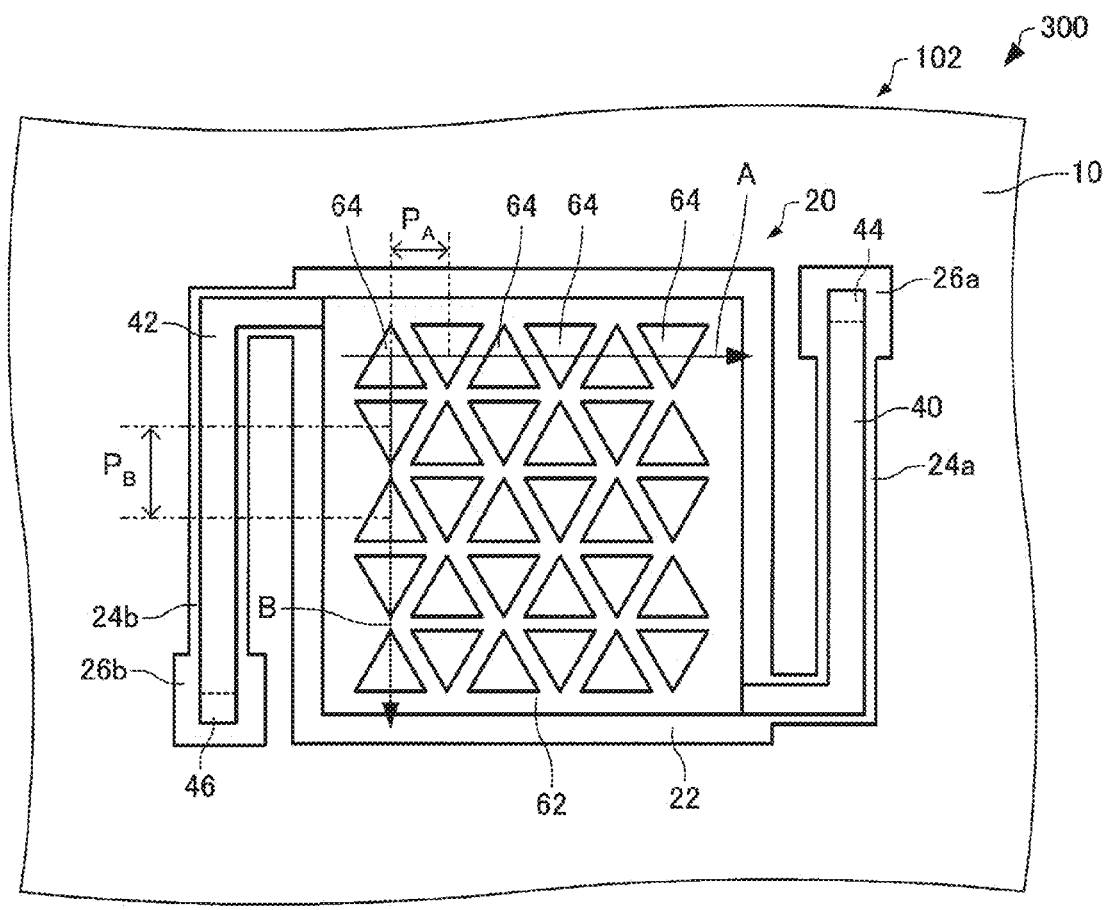
FIG. 14 is a plan view schematically showing a terahertz wave detection device according to a third embodiment of the invention.

Next, a terahertz wave detection device according to a third embodiment will be described with reference to the drawings. FIG. 14 is a plan view schematically showing a terahertz wave detection device 300 according to the third embodiment, and corresponds to FIG. 2.

As shown in FIG. 2, in the terahertz wave detection device 100, the metal structures 64 have square planar shapes. In contrast, as shown in FIG. 14, in the terahertz wave detection device 300, the metal structures 64 have equilateral triangular planar shapes.

According to the terahertz wave detection device 300, similar to the terahertz wave detection device 100, the detection device can have high detection sensitivity.

3.3 Fourth Embodiment

Figure 15:
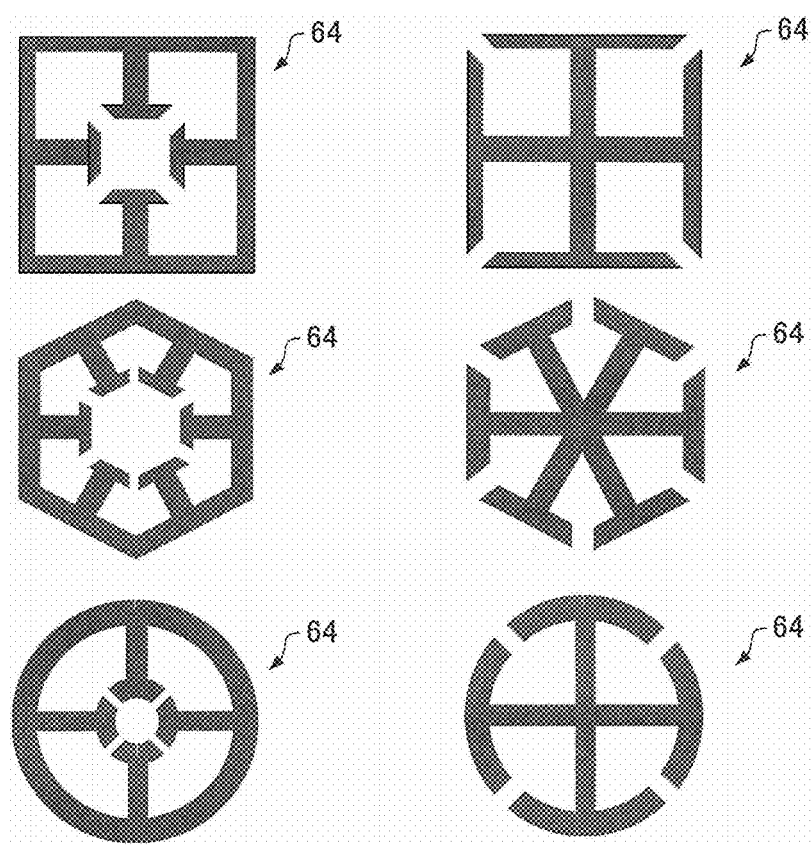
FIG. 15 is a plan view schematically showing a metal structure of a terahertz wave detection device according to a fourth embodiment of the invention.
Figure 16:
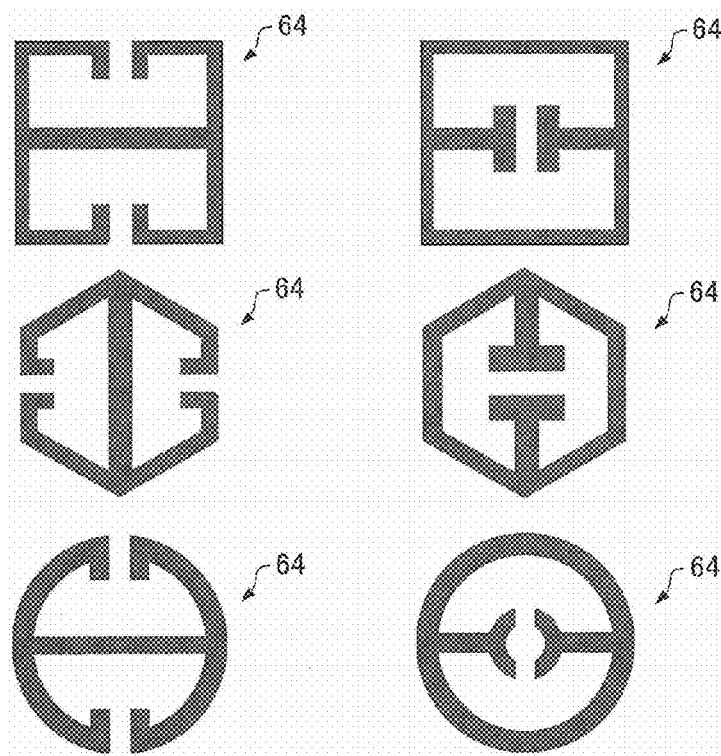
FIG. 16 is a plan view schematically showing the metal structure of the terahertz wave detection device according to the fourth embodiment of the invention.
Figure 17:
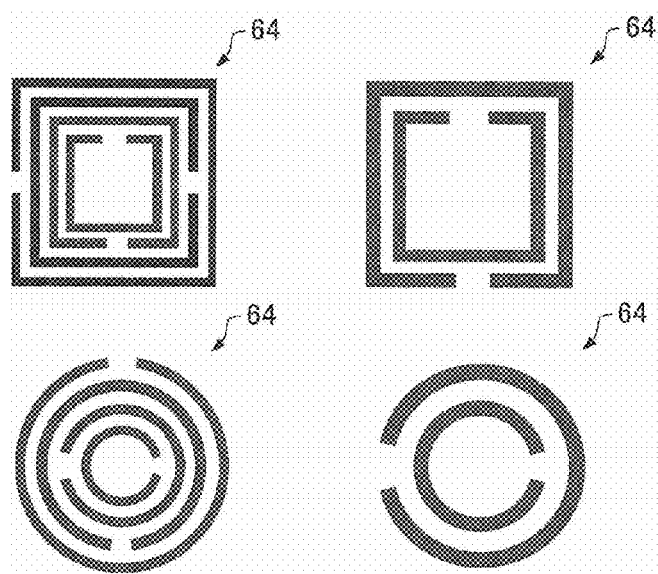
FIG. 17 is a plan view schematically showing the metal structure of the terahertz wave detection device according to the fourth embodiment of the invention.

Next, a terahertz wave detection device according to a fourth embodiment will be described with reference to the drawings. FIGS. 15 to 17 are plan views schematically showing metal structures 64 of the terahertz wave detection device according to the fourth embodiment. Hereinafter, in the terahertz wave detection device according to the fourth embodiment, components which differ from the example of the terahertz wave detection device 100 according to the embodiment will be described, and the descriptions of similar points will be omitted.

As shown in FIG. 2, in the terahertz wave detection device 100, the metal structures 64 have square planar shapes. However, the metal structures 64 are not limited thereto, and as shown in FIGS. 15 to 17, may have various planar shapes.

The metal structures 64 shown in FIG. 15 have planar shapes of 2m-fold symmetry (here, m≥2). Compared to the terahertz wave detection device including metal structures 64 shown in FIGS. 16 and 17, in the terahertz wave detection device including metal structures 64 shown in FIG. 15, the terahertz waves can be detected independently of the directions of the polarized waves. Compared to the terahertz wave detection device including metal structures 64 shown in FIG. 15, the terahertz wave detection device including metal structures 64 shown in FIGS. 16 and 17 can have high absorptivity with respect to the terahertz waves in specific directions of the polarized waves.

4. Imaging Device

Figure 18:
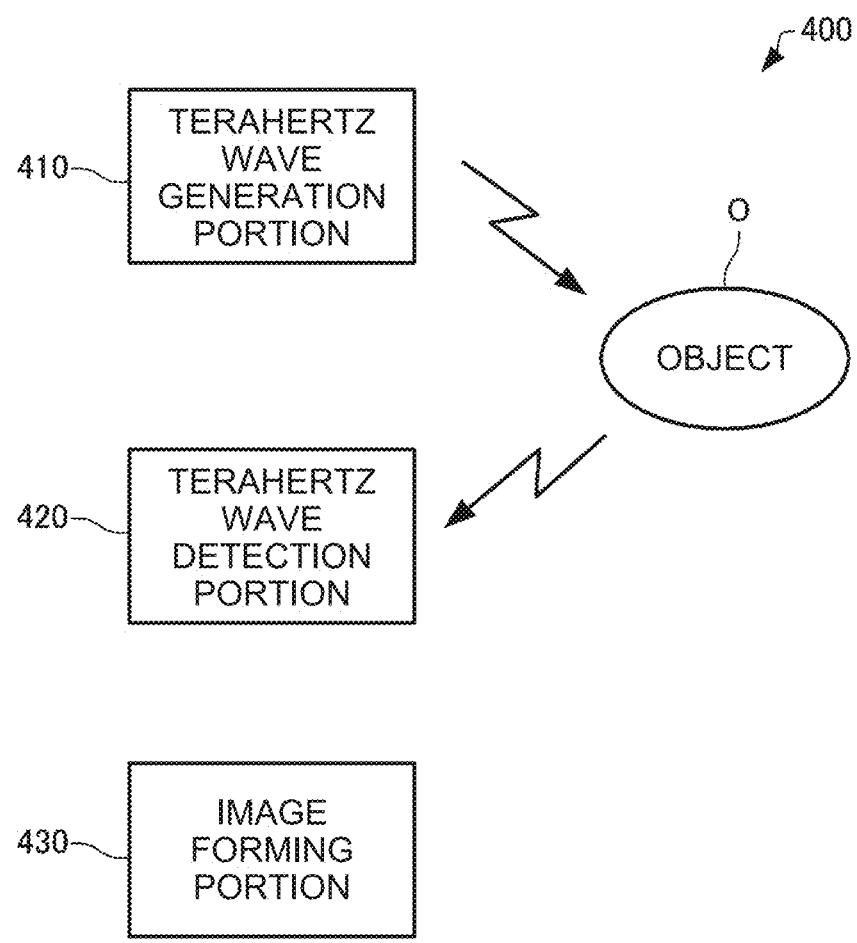
FIG. 18 is a block diagram schematically showing an imaging device according to the first embodiment.
Figure 19:
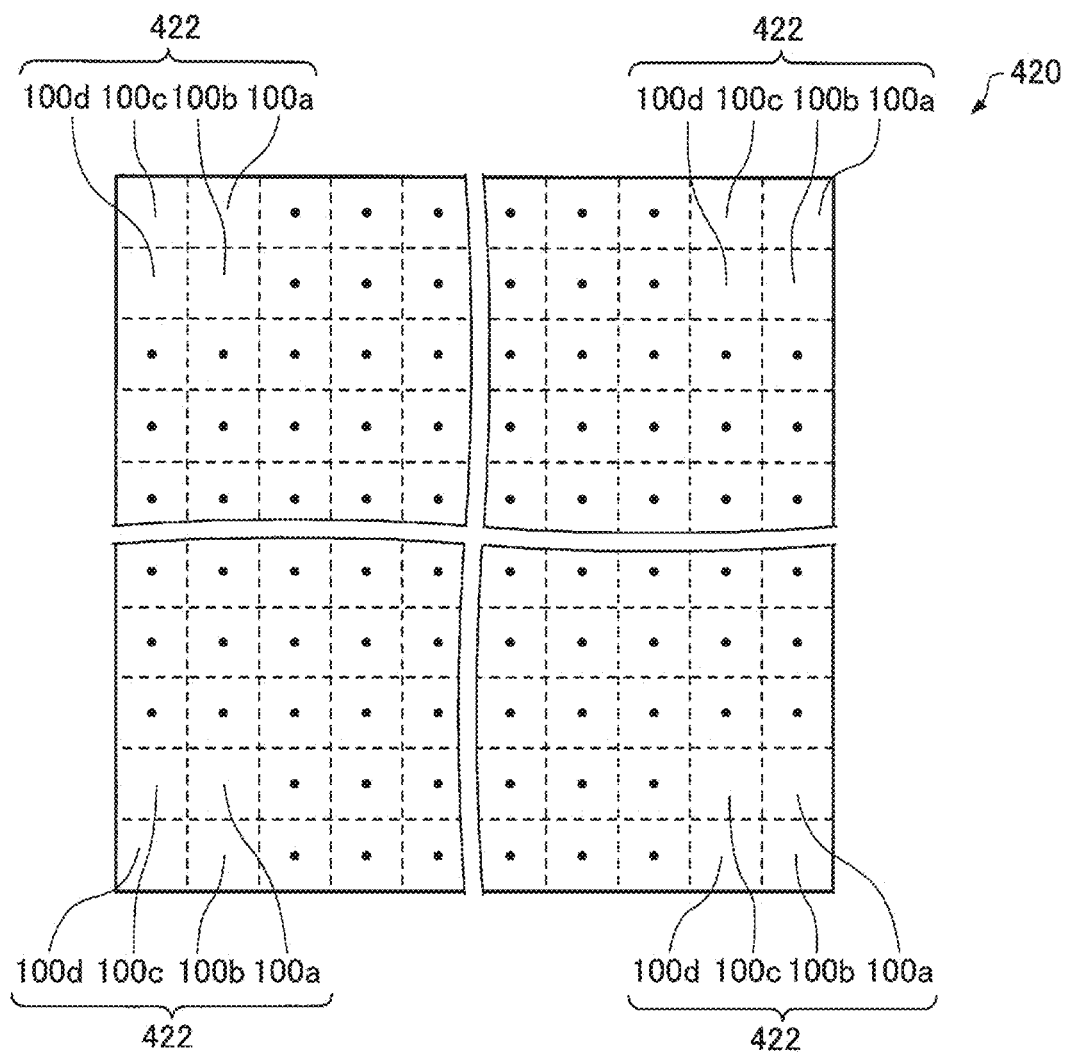
FIG. 19 is a plan view schematically showing a terahertz wave detection portion of the imaging device according to the first embodiment.
Figure 20:
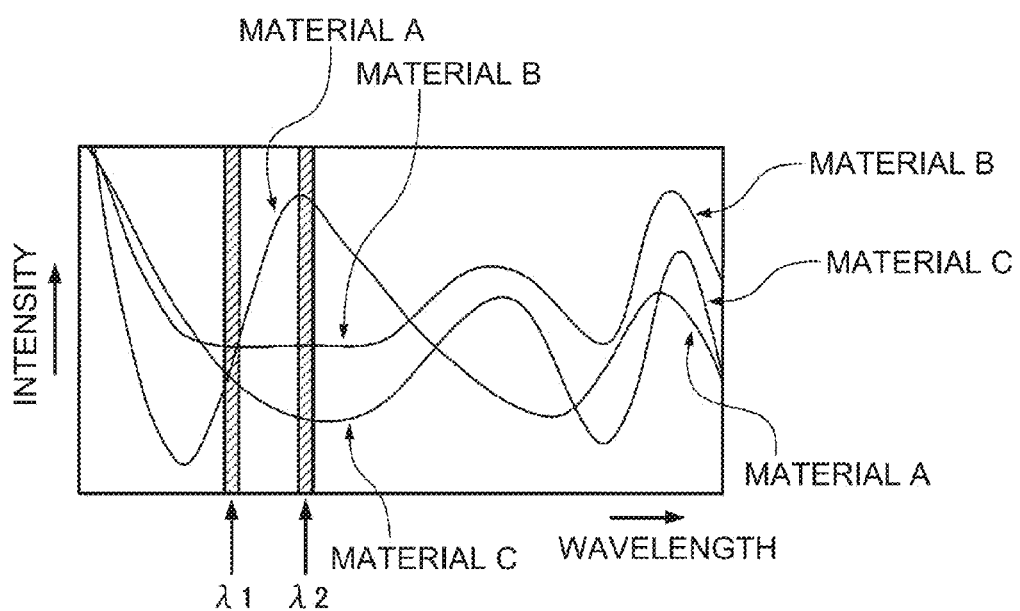
FIG. 20 is a graph showing a spectrum at a terahertz band of an object.
Figure 21:
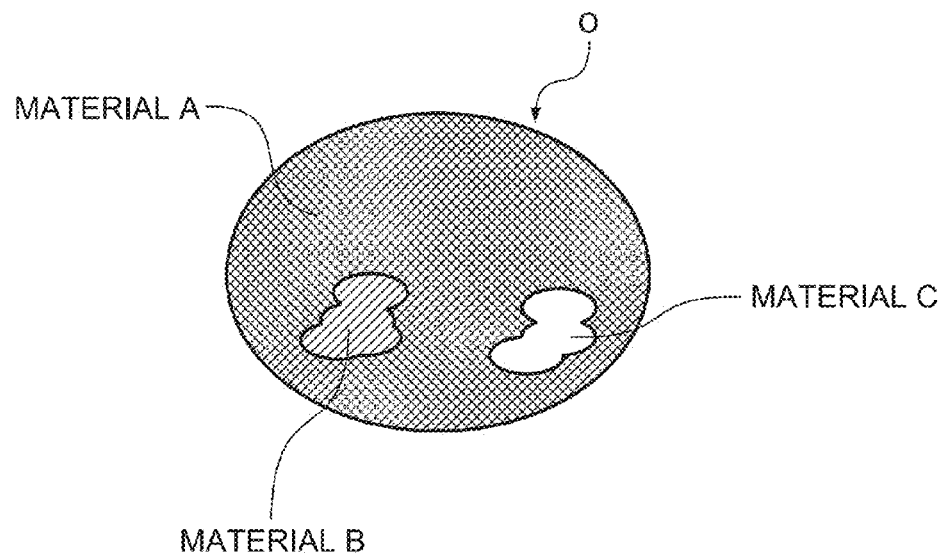
FIG. 21 is an image view showing a distribution of materials A, B, and C of the object.

Next, an imaging device 400 according to the embodiment will be described with reference to the drawings. FIG. 18 is a block diagram showing the imaging device 400 according to the first embodiment. FIG. 19 is a plan view schematically showing a terahertz wave detection portion 420 of the imaging device 400 according to the first embodiment. FIG. 20 is a graph showing a spectrum at a terahertz band of an object. FIG. 21 is an image view showing a distribution of materials A, B, and C of the object.

As shown in FIG. 18, the imaging device 400 includes a terahertz wave generation portion 410 which generates terahertz waves, the terahertz wave detection portion 420 which detects the terahertz waves which are emitted from the terahertz wave generation portion 410 and transmitted through an object O, or the terahertz waves which are reflected by the object O, and an image forming portion 430 which generates an image of the object O, that is, image data based on the detection results of the terahertz wave detection portion 420.

For example, as terahertz wave generation portion 410, a quantum cascade laser, a system using a photoconductive antenna and a short-pulse laser, and a difference frequency generating system using non-linear optical crystals are used.

The terahertz wave detection portion 420 includes the terahertz wave detection device according to the invention. Hereinafter, an example in which the terahertz wave detection device 100 is used as the terahertz wave detection device according to the invention will be described.

As shown in FIG. 19, the terahertz wave detection portion 420 includes a plurality of pixels 422. In the shown example, the shapes of the pixels 422 are squares. The pixels 422 are disposed in a matrix form. The number of the pixels 422 is not particularly limited. The pixels 422 are configured of the plurality of terahertz wave detection devices 100. The number of the terahertz wave detection devices 100 configuring each pixel 422 is not particularly limited. In the shown example, the pixel 422 is configured of four terahertz wave detection devices 100 (terahertz wave detection devices 100a, 100b, 100c, and 100d).

The terahertz wave detection devices 100a, 100b, 100c, and 100d can selectively detect terahertz waves having wavelengths different from one another. Specifically, in the terahertz wave detection devices 100a, 100b, 100c, and 100d, at least one of the shapes and sizes of the metal structures 64 is different, and accordingly, the terahertz wave detection devices 100a, 100b, 100c, and 100d can absorb terahertz waves having wavelengths different from one another. That is, in each pixel 422, the terahertz waves having four wavelengths can be detected.

Next, a use example of the imaging device 400 will be described.

First, the object O which is subject to spectral imaging is configured of three materials A, B, and C. The imaging device 400 performs spectral imaging of the object O. Moreover, here, as an example, the terahertz wave detection portion 420 is set to detect the terahertz waves which are reflected by the object O.

Moreover, in each pixel 422 of the terahertz wave detection portion 420, the terahertz wave detection device 100a and the terahertz wave detection device 100b are used. When the wavelength (absorbed wavelength) which is detected in the terahertz wave detection device 100a is set to $\lambda 1$, the wavelength (absorbed wavelength) which is detected in the terahertz wave detection device 100b is set to $\lambda 2$, intensity of the component of the wavelength $\lambda 1$ in the terahertz wave reflected by the object O is set to $\alpha 1$, and intensity of the component of the wavelength $\lambda 2$ in the terahertz wave reflected by the object O is set to $\alpha 2$, the wavelength $\lambda 1$ detected in the terahertz wave detection device 100a and the wavelength $\lambda 2$ detected in the terahertz wave detection device 100b are set so that differences ($\alpha 2 - \alpha 1$) between the intensity $\alpha 1$ and the intensity $\alpha 2$ are significantly distinguished from one another in the materials A, B, and C.

As shown in FIG. 20, in the material A, the difference ($\alpha 2 - \alpha 1$) between the intensity $\alpha 1$ of the component of the wavelength $\lambda 1$ and the intensity $\alpha 2$ of the component of the wavelength $\lambda 2$ in the terahertz wave reflected by the object O becomes a positive value. Moreover, in the material B, the difference ($\alpha 2 - \alpha 1$) between the intensity $\alpha 1$ and the intensity $\alpha 2$ becomes zero. In addition, in the material C, the difference ($\alpha 2 - \alpha 1$) between the intensity $\alpha 1$ and the intensity $\alpha 2$ becomes a negative value.

According to the imaging device 400, when the spectral imaging of the object O is performed, first, the terahertz waves are generated by the terahertz wave generation portion 410, and the terahertz waves are radiated to the object O. Moreover, the terahertz waves reflected by the object O are detected as $\alpha 1$ and $\alpha 2$ by the terahertz wave detection portion 420. The detection results are sent to the image forming portion 430. Moreover, the radiation of the terahertz waves to the object O and the detection of the terahertz waves reflected by the object O are performed on the entire object O.

In the image forming portion 430, the difference ($\alpha 2 - \alpha 1$) between the intensity $\alpha 1$ of the component of the wavelength $\lambda 1$ in the terahertz waves detected in the terahertz wave detection device 100a and the intensity $\alpha 2$ of the component of the wavelength $\lambda 2$ in the terahertz waves detected in the terahertz wave detection device 100b is obtained based on the detection result. Moreover, in the object O, the materials A, B, and C are specified so that a portion in which the difference becomes a positive value is determined as the material A, a portion in which the difference becomes zero is determined as the material B, and a portion in which the difference becomes a negative value is determined as the material C.

Moreover, as shown in FIG. 21, in the image forming portion 430, image data of the images showing the distribution of the materials A, B, and C of the object O is prepared. The image data is sent from the image forming portion 430 to a monitor (not shown), and the image showing the distribution of the materials A, B, and C of the object O is displayed on the monitor. In this case, for example, the image is displayed so that an area in which the material A is distributed is colored black, an area in which the material B is distributed is colored gray, and an area in which the material C is distributed is colored white in the object O. As described above, in the imaging device 400, the identification of each material configuring the object O and the distribution measurement of each material can be simultaneously performed.

Moreover, the use of the imaging device 400 is not limited to those described above. For example, the terahertz waves are radiated to a person, the terahertz waves which are transmitted through the person or are reflected from the person are detected, the processing in the image forming portion 430 is performed, and thus, it can be determined whether or not the person possesses a gun, a knife, illegal drugs, or the like.

According to the imaging device 400, since the imaging device includes the terahertz wave detection device 100, the imaging device can have high detection sensitivity.

5. Measuring Device

Figure 22:
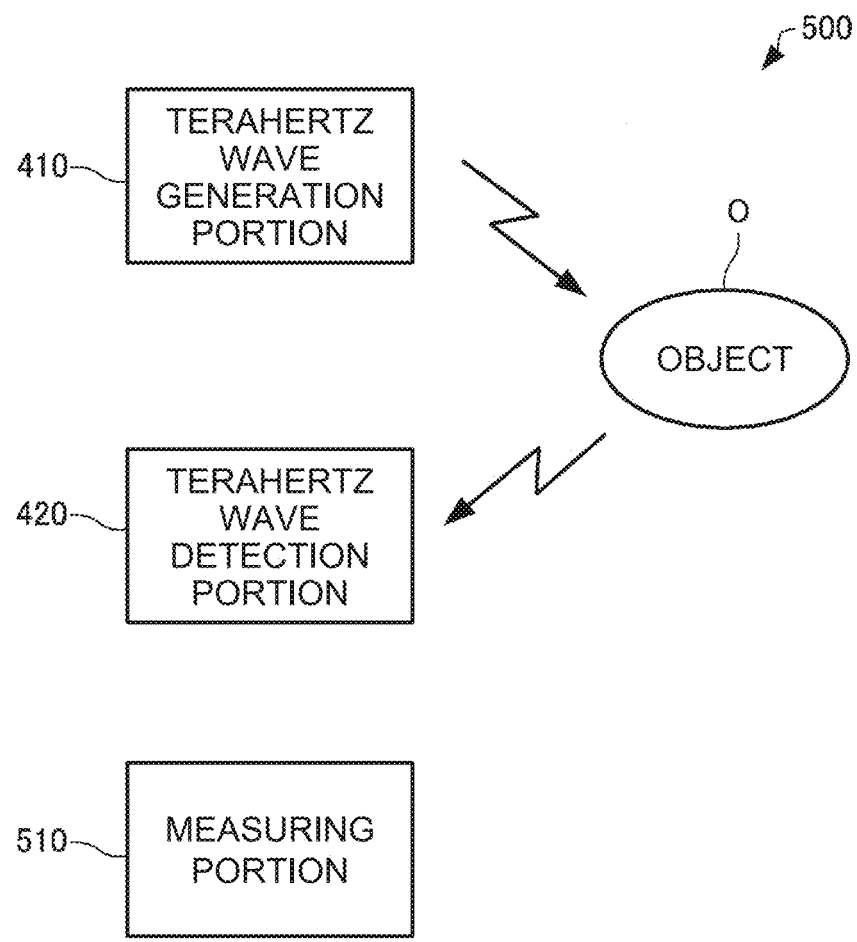
FIG. 22 is a block diagram schematically showing a measuring device according to the first embodiment.

Next, a measuring device 500 according to the embodiment will be described with reference to the drawings. FIG. 22 is a block diagram showing the measuring device 500 according to the first embodiment.

Hereinafter, in the measuring device 500 according to the embodiment, the same reference numerals are attached to members having the same functions as the component members of the imaging device 400 according to the embodiment, and the detailed descriptions thereof are omitted. This is also applied similarly to a camera 600 according to the embodiment described below.

As shown in FIG. 22, the measuring device 500 includes the terahertz wave generation portion 410 which generates terahertz waves, the terahertz wave detection portion 420 which detects the terahertz waves which are emitted from the terahertz wave generation portion 410 and transmitted through the object O, or the terahertz waves which are reflected by the object O, and a measuring portion 510 which measures the object O based on the detection results of the terahertz wave detection portion 420.

Next, a use example of the measuring device 500 will be described. When the spectroscopic measurement of the object O is performed by the measuring device 500, first, the terahertz waves are generated by the terahertz wave generation portion 410, and the terahertz waves are radiated to the object O. Moreover, the terahertz waves transmitted through the object O or the terahertz waves reflected by the object O are detected by the terahertz wave detection portion 420. The detection results are sent to the measuring portion 510. Moreover, the radiation of the terahertz waves to the object O, and the detection of the terahertz waves transmitted through the object O or the terahertz waves reflected by the object O are performed on the entire object O.

In the measuring portion 510, the intensity of each of the terahertz waves detected in the terahertz wave detection devices 100a, 100b, 100c, and 100d configuring each pixel 422 is comprehended from the detection results, and analysis with respect to the components or the distribution of the object O or the like is performed.

Since the measuring device 500 includes the terahertz wave detection device 100, the measuring device can have high detection sensitivity.

6. Camera

Figure 23:
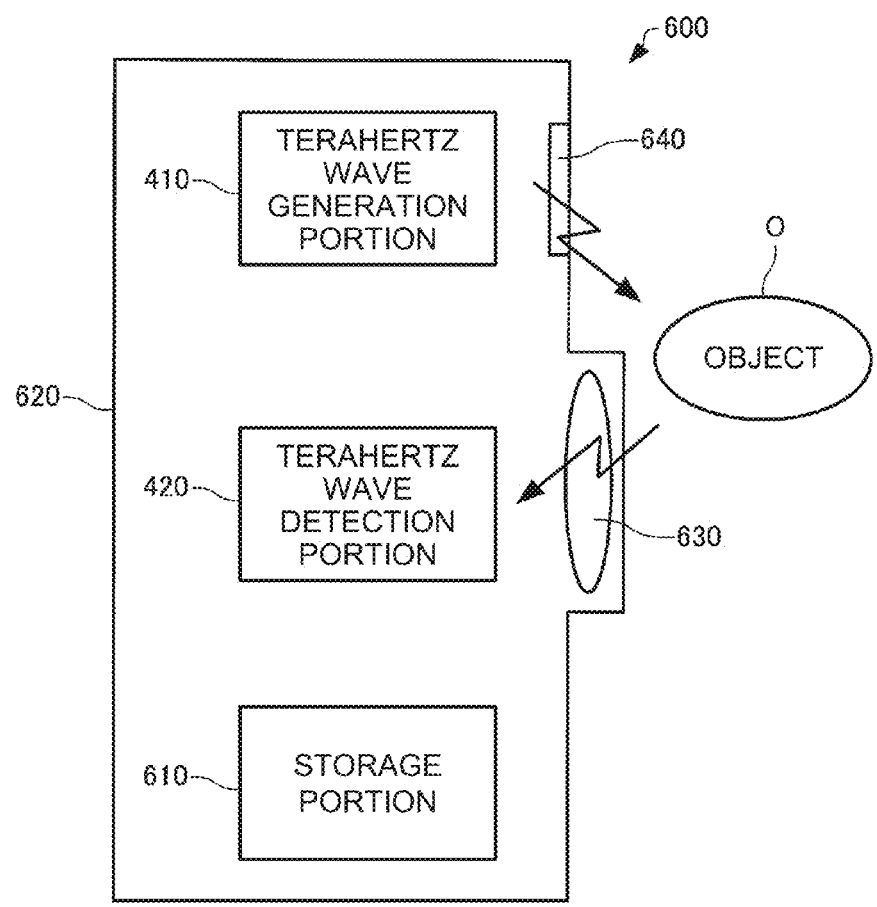
FIG. 23 is a block diagram schematically showing a camera according to the first embodiment.
Figure 24:
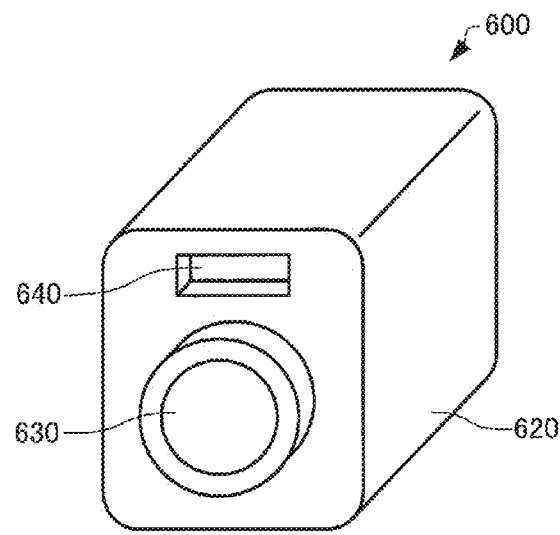
FIG. 24 is a perspective view schematically showing the camera according to the first embodiment.

Next, the camera 600 according to the embodiment will be described with reference the drawings. FIG. 23 is a block diagram showing the camera 600 according to the first embodiment. FIG. 24 is a perspective view schematically showing the camera 600 according the first embodiment.

As shown in FIGS. 23 and 24, the camera 600 includes the terahertz wave generation portion 410 which generates terahertz waves, the terahertz wave detection portion 420 which detects the terahertz waves which are emitted from the terahertz wave generation portion 410 and are reflected by the object O, or the terahertz waves which are transmitted through the object O, and a storage portion 610 which stores the detection results of the terahertz wave detection portion 420. In addition, the portions 410, 420, and 610 are each accommodated in a casing 620 of the camera 600. Moreover, the camera 600 includes a lens (optical system) 630 by which the terahertz waves reflected by the object O converge (form an image) in the terahertz wave detection portion 420 and a window portion 640 to emit the terahertz waves generated in the terahertz wave generation portion 410 to the outside of the casing 620. The lens 630 or the window portion 640 is configured of a member such as silicon, quartz, or polyethylene, through which the terahertz waves are transmitted and refracted. Moreover, the window portion 640 may be configured so that merely an opening such as a slit is provided.

Next, a use example of the camera 600 will be described. When the object O is imaged by the camera 600, first, the terahertz waves are generated by the terahertz wave generation portion 410, and the terahertz waves are radiated to the object O. Moreover, the terahertz waves reflected by the object O are detected to converge (to form an image) in the terahertz wave detection portion 420 by the lens 630. The detection results are sent to the storage portion 610 and stored. In addition, the radiation of the terahertz waves to the object O and the detection of the terahertz waves reflected by the object O are performed on the entire object O. Moreover, for example, the detection results may be sent to an external device such as a personal computer. In the personal computer, each processing is performed based on the detection results.

Since the camera 600 includes the terahertz wave detection device 100, the camera can have high detection sensitivity.

The above-described embodiments and modification examples are examples and are not limited thereto. For example, each embodiment and each modification example can be appropriately combined.

The invention includes substantially the same configurations (for example, configurations in which functions, methods, and effects are the same, or configurations in which objects and effects are the same) as the configurations described in the first embodiment. Moreover, the invention includes configurations in which nonessential portions in the configurations described in the first embodiment are replaced. In addition, the invention includes configurations which have the same effects or achieve the same objects as the configurations described in the first embodiment. Moreover, the invention includes configurations in which the related art is added to the configurations described in the first embodiment.

What is claimed is:

1. A terahertz wave detection device comprising:
    an absorption portion configured to absorb a terahertz wave and generate heat; and
    a conversion portion configured to convert the heat generated by the absorption portion into an electric signal,
    wherein the absorption portion includes:
        a dielectric layer;
        a plurality of metal structures which are provided on a first surface of the dielectric layer and are arranged to be separated from one another by an interval having a predetermined length; and
        a metal layer which is provided on a second surface of the dielectric layer, and
    wherein the predetermined length of the interval between the plurality of metal structures is shorter than a wavelength of the terahertz wave which is absorbed by the absorption portion.

2. The terahertz wave detection device according to claim 1,
    wherein a sheet resistance of the metal structures and a sheet resistance of the metal layer are 10 Ω/□ or less.

3. A camera comprising:
    a terahertz wave generation portion configured to generate a terahertz wave;
    the terahertz wave detection device according to claim 2, wherein the terahertz wave detection device is configured to detect the terahertz wave which is emitted from the terahertz wave generation portion and transmitted through an object, or the terahertz wave which is reflected by the object; and
    a storage portion configured to store a detection result of the terahertz wave detection device.

4. An imaging device comprising:
    a terahertz wave generation portion configured to generate a terahertz wave;
    the terahertz wave detection device according to claim 2, wherein the terahertz wave detection device is configured to detect the terahertz wave which is emitted from the terahertz wave generation portion and transmitted through an object, or the terahertz wave which is reflected by the object; and an image forming portion configured to generate an image of the object based on a detection result of the terahertz wave detection device.

5. The terahertz wave detection device according to claim 1, wherein the conversion portion is a pyroelectric sensor.

6. A camera comprising:
a terahertz wave generation portion configured to generate a terahertz wave;
the terahertz wave detection device according to claim 5, wherein the terahertz wave detection device is configured to detect the terahertz wave which is emitted from the terahertz wave generation portion and transmitted through an object, or the terahertz wave which is reflected by the object; and
a storage portion configured to store a detection result of the terahertz wave detection device.

7. An imaging device comprising:
a terahertz wave generation portion configured to generate a terahertz wave;
the terahertz wave detection device according to claim 5, wherein the terahertz wave detection device is configured to detect the terahertz wave which is emitted from the terahertz wave generation portion and transmitted through an object, or the terahertz wave which is reflected by the object; and
an image forming portion configured to generate an image of the object based on a detection result of the terahertz wave detection device.

8. A camera comprising:
a terahertz wave generation portion configured to generate a terahertz wave;
the terahertz wave detection device according to claim 1, wherein the terahertz wave detection device is configured to detect the terahertz wave which is emitted from the terahertz wave generation portion and transmitted through an object, or the terahertz wave which is reflected by the object; and
a storage portion configured to store a detection result of the terahertz wave detection device.

9. An imaging device comprising:
a terahertz wave generation portion configured to generate a terahertz wave;
the terahertz wave detection device according to claim 1, wherein the terahertz wave detection device is configured to detect the terahertz wave which is emitted from the terahertz wave generation portion and transmitted through an object, or the terahertz wave which is reflected by the object; and
an image forming portion configured to generate an image of the object based on a detection result of the terahertz wave detection device.

10. A terahertz wave detection device comprising:
an absorption portion configured to absorb a terahertz wave, configured to generate heat, and includes a metamaterial; and
a conversion portion configured to convert the heat generated by the absorption portion into an electric signal,
wherein the absorption portion includes:
a dielectric layer
a plurality of metal structures which are provided on a first surface of the dielectric layer and are arranged to be separated from one another by an interval having a predetermined length: and
a metal layer which is provided on a second surface of the dielectric layer, and
wherein the predetermined length of the interval between the plurality of metal structures is shorter than a wavelength of the terahertz wave which is absorbed by the absorption portion.

11. A camera comprising:
a terahertz wave generation portion configured to generate a terahertz wave;
the terahertz wave detection device according to claim 10, wherein the terahertz wave detection device is configured to detect the terahertz wave which is emitted from the terahertz wave generation portion and transmitted through an object, or the terahertz wave which is reflected by the object; and
a storage portion configured to store a detection result of the terahertz wave detection device.

12. An imaging device comprising:
a terahertz wave generation portion configured to generate a terahertz wave;
the terahertz wave detection device according to claim 10, wherein the terahertz wave detection device is configured to detect the terahertz wave which is emitted from the terahertz wave generation portion and transmitted through an object, or the terahertz wave which is reflected by the object; and
an image forming portion configured to generate an image of the object based on a detection result of the terahertz wave detection device.

* * * * *